United States Patent [19]

Tang

[11] Patent Number: 6,008,561
[45] Date of Patent: Dec. 28, 1999

[54] SWITCHED RELUCTANCE MOTOR WITH DAMPING WINDINGS

[75] Inventor: Yifan Tang, Bridgeton, Mo.

[73] Assignee: Emerson Electric Co., St. Louis, Mo.

[21] Appl. No.: 08/741,724

[22] Filed: Oct. 31, 1996

[51] Int. Cl.$^6$ .......................... H02K 17/28; H02K 15/06; H02K 3/20
[52] U.S. Cl. .......................... 310/183; 310/180; 310/182; 310/184
[58] Field of Search ................................... 310/166, 183, 310/168, 179, 254, 162, 177, 180, 184, 182, 186; 318/701

[56] References Cited

U.S. PATENT DOCUMENTS

| | | | |
|---|---|---|---|
| Re. 28,705 | 2/1976 | Hoffmeyer | 310/180 |
| 2,854,596 | 9/1958 | Weixelman et al. | 310/168 |
| 3,041,486 | 6/1962 | Moffitt | 310/168 |
| 3,204,167 | 8/1965 | Zigler | 318/225 |
| 3,518,473 | 6/1970 | Nordebo | 310/168 |
| 3,564,312 | 2/1971 | Bunea | 310/168 |
| 3,593,051 | 7/1971 | Akbar | 310/166 |
| 3,612,988 | 10/1971 | Wanlass | 323/43.5 R |
| 3,629,518 | 12/1971 | Costa | 179/100.2 T |
| 3,648,206 | 3/1972 | Wanlass | 336/160 |
| 3,679,962 | 7/1972 | Wanlass | 321/18 |
| 3,679,966 | 7/1972 | Wanlass | 323/56 |
| 3,704,402 | 11/1972 | Leitgeb | 310/166 |
| 3,749,990 | 7/1973 | Harz | 318/166 |
| 3,881,146 | 4/1975 | Wanlass | 321/2 |
| 3,940,646 | 2/1976 | Buckman | 310/166 |
| 3,956,678 | 5/1976 | Byrne et al. | 310/168 |
| 3,995,203 | 11/1976 | Török | 318/166 |
| 4,063,135 | 12/1977 | Wanlass | 318/220 |
| 4,095,149 | 6/1978 | Wanlass | 318/220 |
| 4,100,473 | 7/1978 | Lawrenson et al. | 318/696 |
| 4,132,932 | 1/1979 | Wanlass | 318/795 |
| 4,134,055 | 1/1979 | Akamatsu | 318/696 |
| 4,152,630 | 5/1979 | Wanlass | 318/796 |
| 4,187,457 | 2/1980 | Wanlass | 318/729 |
| 4,338,557 | 7/1982 | Wanlass | 318/729 |
| 4,348,605 | 9/1982 | Török | 310/168 |
| 4,409,507 | 10/1983 | Godwin | 310/205 |
| 4,446,416 | 5/1984 | Wanlass | 318/812 |

(List continued on next page.)

OTHER PUBLICATIONS

Areshyan et al.; Abstract from Transfer Functions And An Analysis Of The Dynamic Characteristics Of SGK–SVK Seismometers With An Active Filter; Izvestiva Akademiya Nauk Armyanskoi SSR, Seriya Tekhnicheskaya Nauk (1983) vol. 36, No. 3, pp. 26–31.

Stephenson and Blake, "The Characteristics, Design and Applications of Switched Reluctance Motors and Drives," PCIM Conference & Exhibition, Jun. 21–24, 1993, Nuremberg, Germany.

Li, et al., "A Doubly Salient Permanent Magnet Motor Capable of Field Weakening," U. of Wisconsin—Madison, Dept. of Electrical and Computer Eng. (1995).

Llang, et al., "A New Variable Reluctance Motor Utilizing An Auxiliary Commutation Winding," pp. 423–432, IEEE Proc. (1994).

Llang, et al., "A New Variable Reluctance Motor Utilizing an Auxiliary Commutation Winding," pp. 219–225, U. of Wisconsin—Madison, Dept. of Electrical and Computer Eng. (1992).

Li, et al., "A Doubly Salient Doubly Excited Variable Reluctance Motor," pp. 137–143, U. of Wisconsin—Madsion, Dept. of Electrical and Computer Eng. (1993).

(List continued on next page.)

*Primary Examiner*—Nestor Ramirez
*Assistant Examiner*—Tran N Nguyen

[57] ABSTRACT

A reluctance machine including one or more damping windings placed within the stator or within the rotor which are used to store and provide energy so as to reduce unwanted machine vibration and noise, improve current commutation, and improve the efficiency and torque output of the machine.

32 Claims, 25 Drawing Sheets

U.S. PATENT DOCUMENTS

| | | | |
|---|---|---|---|
| 4,520,287 | 5/1985 | Wang et al. | 310/184 |
| 4,628,245 | 12/1986 | Quayle | 310/198 |
| 4,670,696 | 6/1987 | Byrne et al. | 318/701 |
| 5,019,766 | 5/1991 | Hsu et al. | 318/807 |
| 5,111,095 | 5/1992 | Hendershot | 310/168 |
| 5,113,113 | 5/1992 | Tepavcevic | 318/701 |
| 5,122,705 | 6/1992 | Kusase et al. | 310/68 D |
| 5,304,882 | 4/1994 | Lipo et al. | 310/156 |
| 5,376,851 | 12/1994 | Lipo et al. | 310/179 |
| 5,410,203 | 4/1995 | Lürkens | 310/163 |
| 5,422,525 | 6/1995 | Mansir | 310/179 |
| 5,455,473 | 10/1995 | Lipo et al. | 310/114 |
| 5,459,385 | 10/1995 | Lipo et al. | 318/701 |
| 5,545,938 | 8/1996 | Mecrow | 310/156 |
| 5,668,458 | 9/1997 | Ueda et al. | 318/716 |

OTHER PUBLICATIONS

Pulle, "Performance of Split–Coil Switched Reluctance Drive," pp. 318–323, IEE Proc., vol. 135, Pt. B, No. 6 (1988).

Wanlass, et al., "New Directions in Linear Microcircuits," 1968 Wescon Technical Papers, Western Electric Show and COnventions, Aug. 20–23, 1968.

SWITCHED RELUCTANCE MOTOR WITH DAMPING WINDINGS

BACKGROUND OF THE INVENTION

In general, a reluctance machine is an electric machine in which torque is produced by the tendency of a movable part to move into a position where the inductance of an energized phase winding is maximized. In one type of reluctance machine the energization of the phase windings occurs at a controlled frequency. These machines are generally referred to as synchronous reluctance machines. In another type of reluctance machine, circuitry is provided for detecting the position of the movable part (generally referred to as a "rotor") and energizing the phase windings as a function of the rotor's position. These types of machines are generally known as switched reluctance machines. The present invention is applicable to both synchronous and switched reluctance machines.

The general theory of the design and operation of reluctance machines in general, and switched reluctance machines in particular, is known in the art and is discussed, for example, in Stephenson and Blake, "The Characteristics, Design and Applications of Switched Reluctance Motors and Drives", Presented at the PCIM '93 Conference and Exhibition at Nuremberg, Germany, June 21–24, 1993.

As explained above, the basic mechanism for torque production in a traditional reluctance motor is the tendency of the rotor to move into a position to increase the inductance of the energized phase winding. In general, the magnitude of the torque produced by this mechanism corresponds to the magnitude of the current in the energized phase winding such that the motor torque is heavily dependent on the phase current waveforms. For an ideal traditional reluctance motor with no magnetic saturation, the instantaneous torque T, per phase, is:

$$T = \frac{1}{2} i^2 \frac{dL}{d\theta}$$

Where i is the instantaneous current in the energized phase winding and $dL/d\theta$ is the derivative of the phase inductance L with respect to the rotor position $\theta$. While all practical reluctance motors have some magnetic saturation, this equation is useful for purposes of the present analysis.

As a switched reluctance motor (or generator) operates, magnetic flux is continuously increasing and decreasing in different parts of the machine. The changing flux results in fluctuating magnetic forces being applied to the ferromagnetic parts of the machine and in rapidly varying and pulsating radial forces. These forces can produce unwanted vibration and noise. One major mechanism by which these forces can create noise is the ovalizing of the stator caused by forces normal to the air-gap. Generally, as the magnetic flux increases along a given diameter of the stator, the stator is pulled into an oval shape by the magnetic forces. As the magnetic flux decreases, the stator springs back to its undistorted shape with possible overshoots. This ovalizing and springing back of the stator can cause unwanted vibration and consequently produce audible noise.

In addition to the distortions of the stator by the ovalizing magnetic forces, unwanted vibration and acoustic noise may also be produced by abrupt changes in the magnetic forces in the motor. These abrupt changes in the gradient of the magnetic flux (i.e., the rate of change of the flux with time) may be referred to as "hammer blows" because the effect on the stator is similar to that of a hammer strike. Just as a hammer strike may cause the stator to vibrate at one or more natural frequencies (determined by the mass and elasticity of the stator) the abrupt application or removal of magnetic force can cause the stator to vibrate at one or more of its natural frequencies. In general, the lowest (or fundamental) natural frequency dominates the vibration, although higher harmonics may be emphasized by repeated excitation at the appropriate frequency. These abrupt changes in machine flux often occur at the current commutation instant when the energization of an active phase winding is switched off. This current commutation contribution to unwanted noise and vibration is a difficult problem since such current commutation is an inherent characteristic of conventional switched reluctance machines. Moreover, the problem of unwanted noise and vibration is particulate significant at low rotational speeds where the stator has more time to "spring back" in response to changes in the magnetic characteristics of the machine.

Although the problem of unwanted acoustic noise and vibration has been recognized, known solutions often do not adequately solve the problem and/or require complex, and potentially expensive, controls for controlling the current in the windings of a reluctance machine.

As explained briefly above, in most switched reluctance machines, current in an active phase winding is switched on to produce positive torque when the inductance of the phase winding is increasing and switched off to avoid negative torque when the inductance of the phase winding is decreasing. To produce the appropriate amount of output torque it is important that the magnitude of the current be at a sufficient value over an appropriate portion of the positive-rising inductance region. The inductance of the phase winding, however, limits the rate at which the current in the phase winding may change and tends to slow down the current rise and fall time. This inductance, thus, tends to limit the current available for torque production. Moreover, the back-EMF produced by an operating machine also tends to limit the rate of change of the current and thus potentially limit the torque output of the machine. The limiting effects of the phase winding inductance and the back-EMF become more serious as the rotational speed of the machine increases and the back-EMF becomes greater and the time allowed for current rise and fall time becomes more limited.

A further limitation of conventional reluctance machines concerns the rating of the power converter and DC bus (or DC link) capacitor often required with such machines. It is known in the art that during each stroke period of an active phase winding (e.g., the period over which the phase winding is energized and then de-energized) a significant portion of the electrical energy that is applied to the phase winding when the winding was energized and that is not converted into output torque or motor losses is returned to the power converter. This significant energy circulation characteristic often necessitates the use of power converters having relatively high volt-amp ratings (to provide all of the required power) and in the use of relatively large DC bus (DC link) capacitors (to absorb the power returned to the power converter). Such high rated power converters and large capacitors may significantly add to the overall cost of a reluctance machine system.

It is an object of the present invention to overcome these and other limitations of traditional reluctance machines by, inter alai, providing an improved reluctance machine that has one or more auxiliary damping windings that tend to reduce unwanted noise and vibration in a cost-efficient manner; enhance the current commutation characteristics of the machine so as to provide increased output torque and/or motor efficiencies; and allow for the use of reluctance systems having lower rated power converters and smaller DC link capacitors that would normally be required. Other objects and advantages of the present invention will be apparent to one of ordinary skill in the art having the benefit of this disclosure.

SUMMARY OF THE INVENTION

In accordance with an exemplary embodiment of the present invention a reluctance machine is provided that includes a stator, the stator defining a number of stator poles; a rotor defining a plurality of rotor poles where the rotor is positioned to rotate with respect to the stator; a plurality of phase windings positioned within the stator and a plurality of damping windings positioned within the stator, wherein each damping winding forms a closed current loop. The damping windings absorb from and provide energy to the phase windings in such a manner that unwanted noise and vibrations are reduced, current commutation is improved and the efficiency and torque output of the machine are improved.

In accordance with another exemplary embodiment of the present invention a reluctance machine is provided including a stator, the stator defining a given number of stator poles, a rotor, position to rotate with respect to the stator; a plurality of phase windings positioned about the stator; and a plurality of damping coils positioned about the poles of the stator, where each damping coil is positioned about one stator pole. The damping coils may be coupled together in one of many ways to form a damping winding that provides a closed current loop. Such a damping winding may operate as described above to reduce unwanted noise and vibration to improve current commutation; and to increase the efficiency and torque output of the machine. The damping coils may be fully-pitched coils, fractional-pitched coils; or short-pitched coils.

In accordance with yet another exemplary embodiment of the present invention a reluctance machine is provided that comprises a stator; a rotor positioned to rotate with respect to the stator, the rotor defining a plurality of rotor poles; at least one phase winding positioned within the stator; and at least one damping circuit positioned to rotate with the rotor, the damping circuit comprising a closed-current loop. The damping circuit may be a conductive coil or a closed current loop formed by conductive bars. The damping circuit may be positioned about one or more rotor poles, within the rotor yoke, or in the inter-pole regions of the rotor.

Other exemplary embodiments of the present invention and other features of the present invention will be apparent to one of ordinary skill in the art having the benefit of this disclosure.

BRIEF DESCRIPTION OF THE DRAWINGS

Similar reference characters indicate similar parts throughout the several views of the drawings.

DETAILED DESCRIPTION OF THE INVENTION

Figure 1:
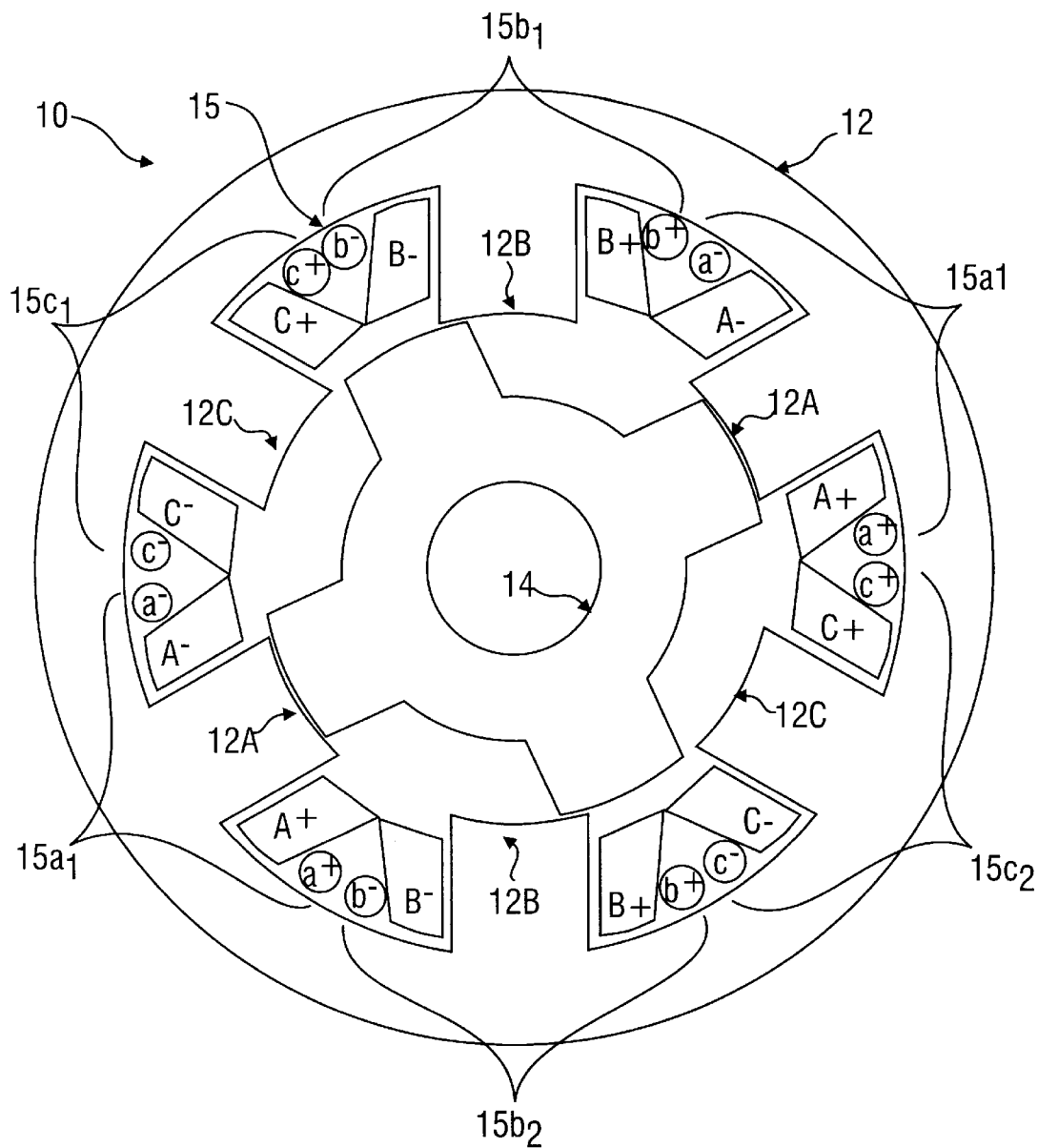
FIG. 1 illustrates a cross-sectional view of a reluctance machine in accordance with certain aspects of the present invention utilizing short-pitched damping coils.

Turning to the drawings and, in particular FIG. 1, a cross sectional view of a reluctance machine 10 in accordance with the present invention is provided. In general, the machine 10 comprises a stator 12 and a rotor 14 positioned within the stator in such a way that it is free to rotate within the stator.

The rotor 14 comprises a stack of identical steel laminations that define four outwardly projecting stator poles. The rotor may be of conventional construction The stator 12 may constructed from a stack of identical steel stator laminations in accordance with standard reluctance machine techniques. In the exemplary embodiment of FIG. 1, the stator defines six inwardly projecting discrete stator poles and three main phase windings A, B and C are positioned around the stator poles so as to define three stator pole pairs 12a, 12b, and 12c. In the example of FIG. 1, each phase winding comprises two coils (connected in series or parallel) and each phase winding is separately energizable from the other phase windings. The coils of the phase windings A, B and C are positioned such that the magnetic fields established when unidirectional current flows in the phase windings, in the same direction, have an orientation corresponding to the arrows A, B and C of FIG. 1. For example, the coils may be positioned such that, when current flows in a given direction through all three phase windings A, B and C, the tips of the arrows would be the north poles of the respective magnetic fields. Conversely the tips could be the south poles.

The construction of a stator 12 and phase windings A, B and C meeting the above criteria is well within the ability of one of ordinary skill in the art having the benefit of this disclosure and will not be discussed further herein.

In addition to the three separately energizable phase windings A, B, and C, machine 10 also includes an auxiliary damping winding 15 comprising six coils, 15a1, 15a2, 15b1, 15b2, 15c1 and 15c2. Each of the six coils of the damping winding 15 is a "short-pitch" coil in that it surrounds only a single stator pole. For example, the coil 15a1 surrounds one of the coils of the phase A winding and only one stator pole.

In the exemplary machine 10 of FIG. 1, the six coils of the short-pitched damping winding 15 are all connected together to form a closed current loop that is short-circuited internally to the machine 10 and that is not connected to any external electronics or power source. In general, the short-circuited auxiliary short-pitched damping winding 15 functions as a damper for noise and vibration; facilitates rapid current commutation to allow the current to rapidly increase and thus allow for the production of high output torque at high speeds; and retains energy within the motor that would otherwise be returned to the power converter, thus allowing for the use of lower rated power converters and smaller DC link capacitors.

The precise configuration of the short-pitched damping winding 15 will, in general, depend on the manner in which the coils of the main phase windings are coupled. In general, the coils of the auxiliary short-pitched damping winding 15 surrounding the coils of a given phase winding should be coupled together in the same manner in which the coils they surround are coupled. Thus, if the coils comprising each main phase winding are coupled in parallel, the corresponding damping coils should also be coupled in parallel. The same would be true if the phase winding coils were coupled in series. This is illustrated, generally, in FIGS. 2A and 2B.

Figure 2A:
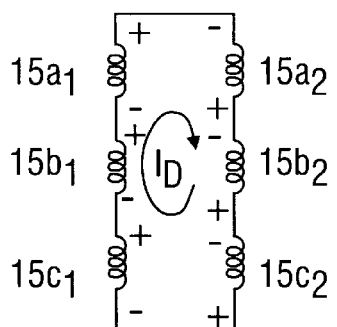
FIG. 2A illustrates an exemplary configuration of the machine of FIG. 1 wherein the short-pitched damping coils are coupled together in series to form a series connected damping winding.
Figure 2B:
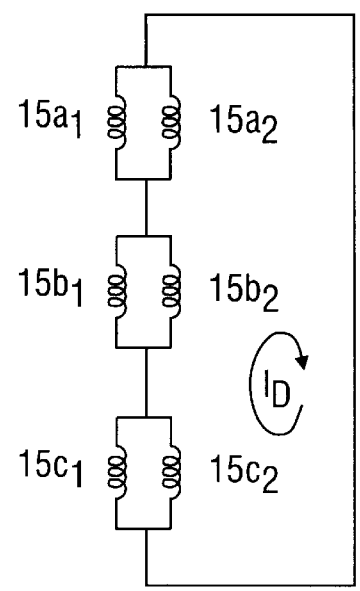
FIG. 2B illustrates an exemplary configuration of the machine of FIG. 1 wherein certain of the short-pitched damping coils are coupled together in parallel to form a damping winding.

FIG. 2A illustrates the configuration of short-pitched damping winding 15 for a reluctance machine 10 where the coils comprising each phase winding are coupled in series. As illustrated in FIG. 2A, in this exemplary embodiment, the appropriate coils from damping winding 15 are coupled in series and the ends of the damping winding are coupled together within the motor to provide a short-circuited winding. FIG. 2B illustrates the configuration of short-pitched damping winding 15 when the coils of the main phase windings are coupled in parallel. Again, the ends of the damping winding are coupled together to provide a short circuited winding.

It may be noted that the self-inductance of the short-pitched damping winding 15 does not significantly change with rotor position. As such, the presence of current in the damping winding 15 does not produce negative torque.

Referring back to FIG. 1, it may be noted from the + and − markings that the coils of the short-pitched damping winding 15 are wound (or placed) around each stator pole to provide magneto-motive forces ("MMFs") that are in the same reference direction as the MMF produced by the main phase winding coils they surround. Alternate embodiments are envisioned wherein the coils of the short-pitched damping winding 15 are wound (or placed) such that the reference directions of the MMFs from the coils of the damping winding are opposite those produced by the main phase winding coils they surround. Still further embodiments are envisioned where the MMF relationship alters between adjacent stator poles (e.g., same, reversed, same, reversed) or alters for each phase windings. These alternate embodiments of the present invention are believed to be potentially applicable to reluctance machines having an even number of phase windings.

The use of the short-pitched damping winding 15 can significantly reduce the amount of unwanted noise and vibration produced by a reluctance machine. This is generally reflected by FIGS. 3A and 3B.

As those of ordinary skill in the art will appreciate, at standstill and at low speeds, the torque of a switched reluctance machine is typically controlled by varying the current in the energized phases over an angular period defined by the turn-on and turn-off angles. When current chopping is used such current control can be achieved by chopping the current using a current reference with phase current feedback. Such current control is referred to as "chopping mode" current control. The problems associated with the production of unwanted noise and vibration are particularly significant at low speed when chopping mode current control is used.

Figure 3A:
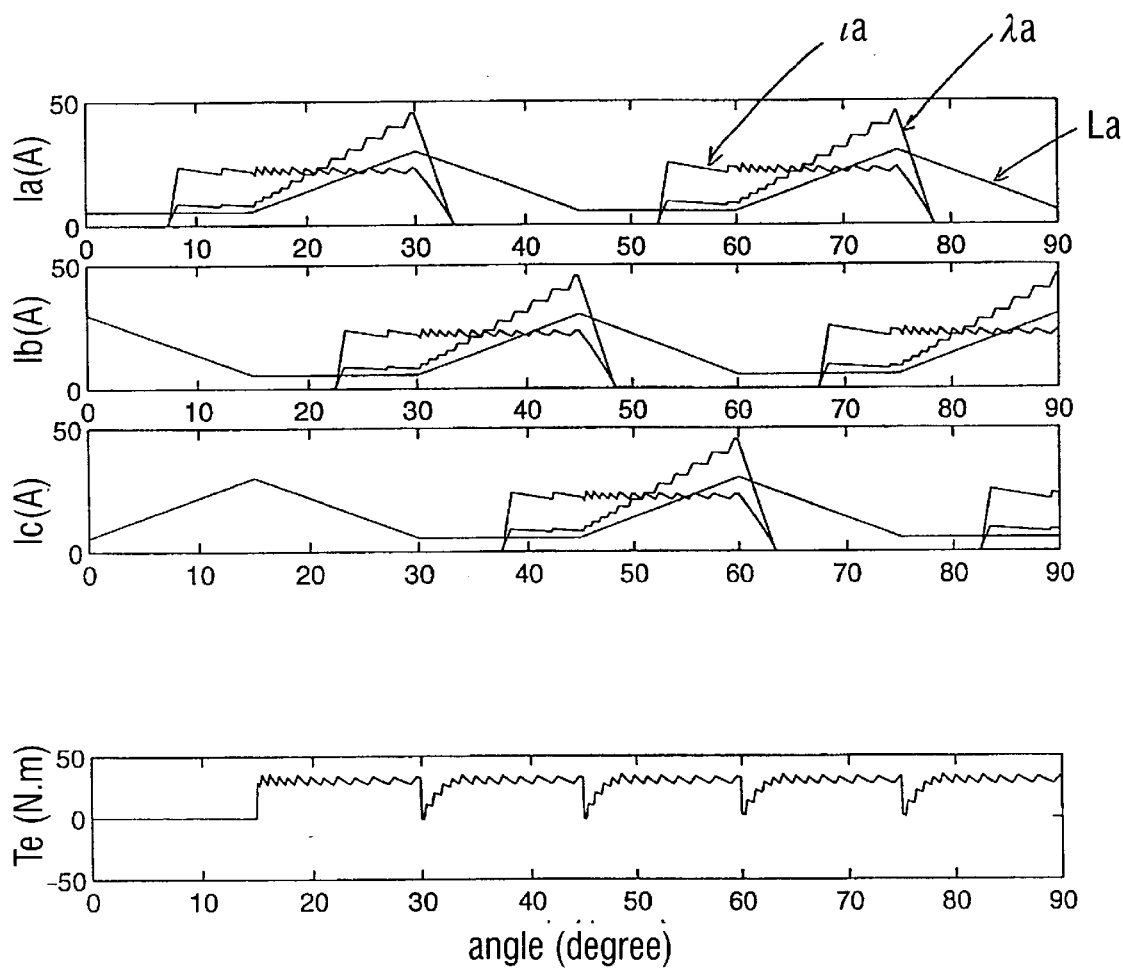
FIG. 3A generally illustrates a dynamic simulation of the phase currents $I_A$, $I_B$ and $I_C$ and torque output Te of a conventional three-phase, twelve-stator pole, eight-rotor pole reluctance machine that does not include a short-pitched damping winding in accordance with the present teachings.

FIG. 3A generally illustrates a dynamic simulation of the phase currents $I_A$, $I_B$ and $I_C$ and torque output Te of a conventional three-phase, twelve-stator pole, eight-rotor pole reluctance machine that does not include a short-pitched damping winding in accordance with the present teachings. The illustration simulation was performed over a rotor rotational interval of 90 degrees and at a rotational speed of 500 rpm. Chopping mode current control is reflected by the "chopped" nature of the phase currents. In the example of FIG. 3A, the phase A winding is energized at the 7.5 degree rotor position and de-energized at the 30 degree rotor position and again energized at the 52.5 degree rotor position and de-energized at the 75 degree rotor position. The 7.5 degree and 52.5 degree rotor positions are the unaligned positions of the rotor with respect to the phase A stator poles, and the 30 degree and 75 degree rotor positions are the aligned positions of the rotor with respect to the phase A stator poles. The energization of the other phase windings is over intervals similar to that of the phase A winding, but displaced from that of the phase A winding by 15 degrees (for phase B) or 30 degrees (for phase C).

The self-inductances $L_A$, $L_B$ and $L_C$ of the three phase windings as well as the flux-linkages $\lambda_A$, $\lambda_B$ and $\lambda_C$ are also provided in FIG. 3A. The values of these quantities have been scaled up for illustration purposes.

As reflected in the torque output Te for FIG. 3A, the intervals at which current commutation occurs are associated with abrupt downturns in the output torque. In the machine of FIG. 3A, these abrupt downturns in the output torque are not counterbalanced or damped in any significant way and, accordingly, tend to cause the stator of the reluctance machine to begin to vibrate, resulting in unwanted noise and vibration. This is reflected in FIG. 3B which illustrates the radial force imposed on the phase A stator poles Fr, the displacement of the stator from its rest position, d, the velocity of the stator movement v and the acceleration of the stator a resulting from the energization and de-energization of the phase A winding for the machine reflected in FIG. 3A. It is known that the closer the rotor is near alignment positions with the stator poles, the larger the radial force on the stator poles if the excitation current is the same, as reflected in FIG. 3B. The radial forces on the stator poles are subsequently transmitted to the stator back iron to cause mechanical responses.

Figure 3B:
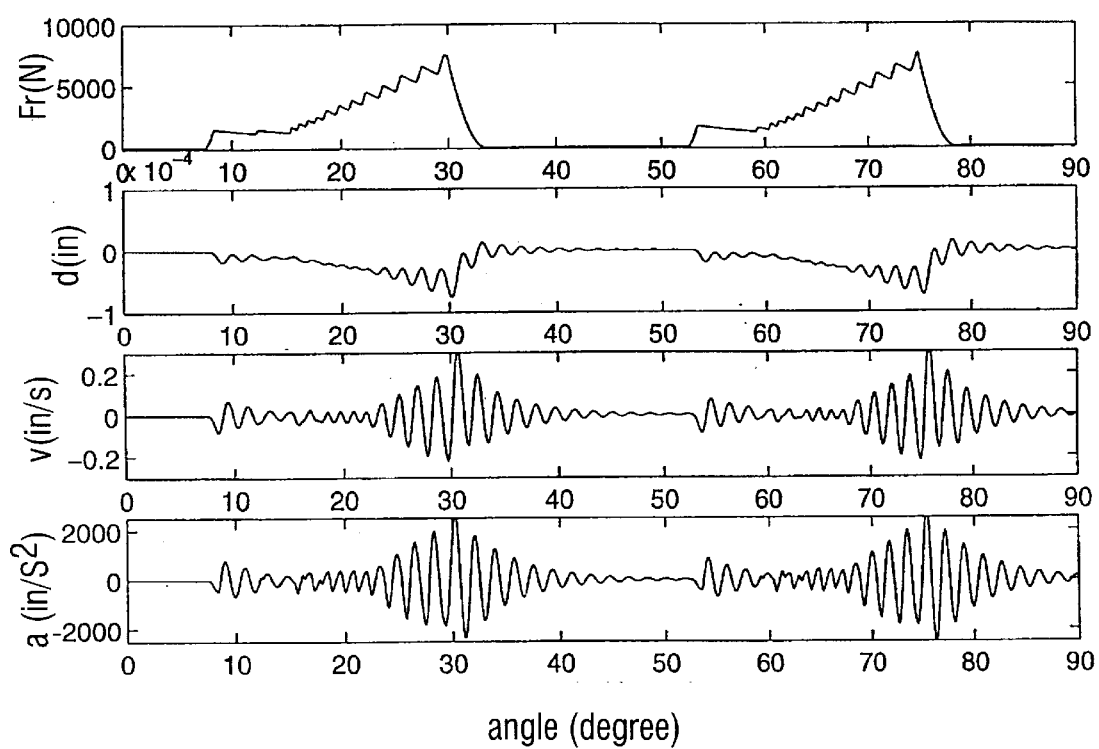
FIG. 3B illustrates the radial force imposed on the phase A stator poles Fr, the displacement of the stator from its rest position, d, the velocity of the stator movement v and the acceleration of the stator a resulting from the energization and de-energization of the phase A winding for the machine reflected in FIG. 3A.

As reflected in FIG. 3B, at the commutation points for the phase A winding, corresponding to rotor positions of 30 degrees and 60 degrees, the forces imposed on the stator abruptly change and cause dramatic oscillations of the stator in terms of displacement, velocity and acceleration. Before the commutation points, vibrations also exist due to the energization of the phase A winding and the bang-bang choppings of the current. The choppings of the current cause larger variations in the radial forces, hence larger vibrations, when the rotor is nearer the alignment positions where the radial force is largest. The forces and oscillations resulting from the energization and de-energization of the phase B and phase C windings of the machine simulated in FIGS. 3A and 3B are similar to those reflected in FIG. 3B.

Figure 4A:
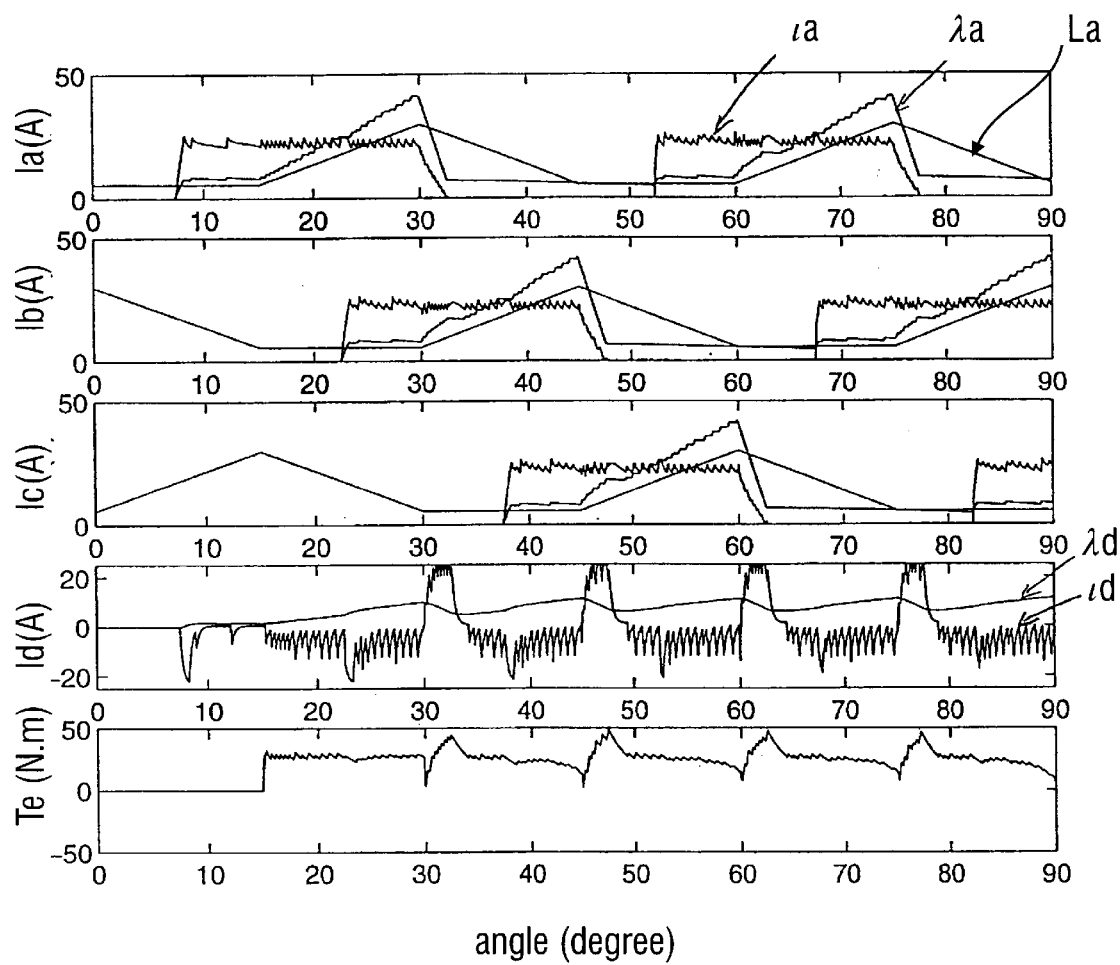
FIG. 4A illustrates a dynamic simulation of the phase currents $I_A$, $I_B$ and $I_C$ of the three phase windings of a twelve-stator pole, eight rotor pole reluctance machine having a short-pitched damping winding like that illustrated in FIG. 1.

FIG. 4A illustrates a dynamic simulation of the phase currents $I_A$, $I_B$ and $I_C$ of the three phase windings of a twelve-stator pole, eight rotor pole reluctance machine having a short-pitched damping winding like that discussed above in connection with FIG. 1. For the machine simulated in FIG. 4A, the damping winding would include twelve individual coils, one for each stator pole. Like FIG. 3A, FIG. 4A also illustrates, with scaling, the self-inductances $L_A$, $L_B$ and $L_C$ and the flux-linkages for the three main phase windings $\lambda_A$, $\lambda_B$, and $\lambda_C$.

In addition to illustrating the currents, self-inductances and flux-linkages for the three phase windings, FIG. 4A also illustrates the current $I_D$ and the flux-linkages $\lambda_D$ for the short-pitched damping winding used according to the teachings of the present invention.

The phase energization intervals for the phase windings of the machine simulated in FIG. 4A are the same as those for FIG. 3A (e.g., for phase A, energize over 7.5 degrees to 30 degrees and for phase B, energize over 22.5 degrees to 45 degrees). Moreover, the assumed rotor speed is the same for the simulation of FIG. 4A as it was for FIG. 3A (500 RPMs).

Referring to the waveform for the short-pitched damping winding current $I_D$, it may be noted that the current generally remains at a negative level except for a limited period following the commutation of an energized phase winding. For example, during the interval corresponding to 7.5 degrees and 30 degrees, the phase A winding is energized and, over that interval, no active phase winding is commutated. Accordingly, the current $I_D$ in the short-pitched damping winding remains at a negative level although it fluctuates in response to the chopping of the current in the phase A winding and the energization and choppings in the phase B winding. At the rotor position of 30 degrees, however, the phase A winding is commutated off. At that point much of the energy that was stored in the phase A winding is transferred from the phase A winding to the short-pitched damping winding. Accordingly, shortly after the phase A winding is commutated off, there is a rapid increase in the current in the short-pitch damping winding $I_D$ and the current $I_D$ goes positive as the damping winding absorbs some of the energy stored in the energized phase windings. Similar transfers of power to the short-pitched winding—and similar positive current pulses of $I_D$—occur at the other points where a phase winding is commutated. In the exemplary embodiment of FIG. 4A, these points occur at the 45 degree position (as phase B is commutated); the 60 degree position (as phase C is commutated); and the 75 degree position (as phase A is commutated again).

The periodic modulation of the current in the short-pitched damping winding and the intervals of positive current in the short-pitched damping winding, tend to affect the output torque of the machine. This is illustrated in the Te output of the machine simulated in FIG. 4A. As illustrated, at the points where the current $I_D$ in the short-pitched damping winding goes positive, there is a temporary increase in the output torque of the machine. This may be observed in FIG. 4A at the points corresponding generally to rotor positions 30 degrees, 45 degrees, 60 degrees and 75 degrees where the output torque Te temporarily exceeds the average torque output.

The temporary increases in the output torque caused by the positive current in the short-pitched damping winding of the machine simulated in FIG. 4A, and the negative current in the damping winding during non-commutation intervals, establish forces in the reluctance machine that tend to dampen the mechanical oscillations that would otherwise be produced, thus reducing the amount of unwanted noise and vibration. This aspect of the present invention is reflected in FIG. 4B which illustrates the simulated vibration characteristics for the twelve stator pole, eight-rotor pole machine with short-pitched damping winding according to the teachings of the present invention with respect to the energization and de-energization of the phase A winding.

Figure 4B:
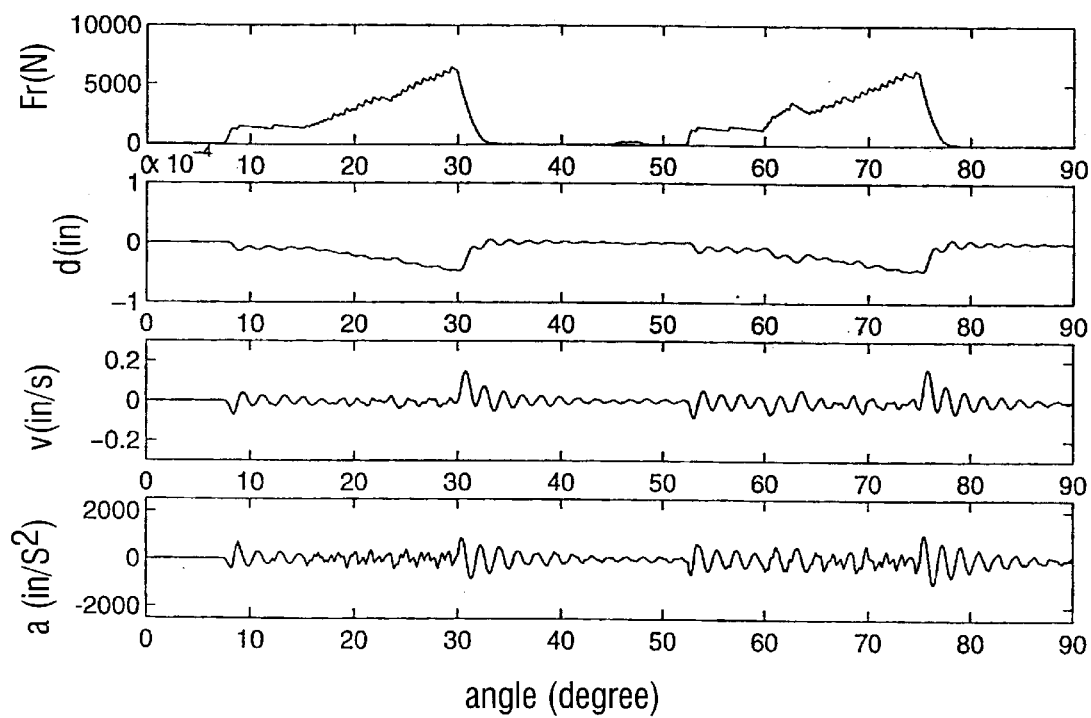
FIG. 4B illustrates the simulated vibration characteristics for the twelve stator pole, eight-rotor pole machine with short-pitched damping winding according to the teachings of the present invention with respect to the energization and de-energization of the phase A winding.

Referring to FIG. 4B, the vibrational characteristics for the twelve-stator pole, eight-rotor pole machine having short-pitched damping winding are illustrated. Comparing the vibration characteristics of the machine of the present invention in FIG. 4B with those of a conventional machine as reflected in FIG. 3B, it may be noted that the use of short-pitched damping winding in accordance with the teachings of the present invention can significantly and dramatically reduce unwanted stator vibration and, thus, unwanted machine noise.

In the machine reflected in the waveforms of FIG. 4A and 4B, the ratio of the number of turns in one of the coils of the damping winding to the number of turns in one of the coils of a main phase winding is 0.2 and the total resistance of the damping winding is approximately 5 ohms. In general, the ratio of the turns of each coil in the short-pitched damping winding to those in a coil of a main phase winding should be relatively low (e.g., approximately 0.2). The precise ratio may be calculated empirically or through testings or simulations by adjusting the ratio until the desired vibrational performance of the machine is achieved.

In addition to keeping the ratio of the turns in the damping coils to the turns in the main coils relatively low, it is also beneficial to keep the total resistance of the short-pitched damping winding low (e.g., on the order of 5 ohms). Such low resistance tend to reduce the ohmic losses associated with the flow of current in the damping winding. While there are some ohmic losses associated with the use of a damping winding in accordance with the teachings of the present invention, these losses are more than offset by the increases in torque and efficiency provided by the present invention and the advantages that may be obtained in terms of lower converter rating, lower DC link capacitor ratings, and lower vibration and noise.

In addition to selecting the turns of the coils in the damping winding and the total resistance of the damping winding (hence transient reactance and time constant of the damping winding) to meet the above-described parameters the turns in the damping winding coils and the resistance of the damping winding should also be selected to meet at least one other criteria. Referring to FIG. 4A it may be noted that, while the current $I_D$ goes positive after each active phase is commutated, $I_D$ returns to negative prior to the energization of the next energized phase winding. For example, following the commutation of the phase A winding at the 30 degree rotor position the current $I_D$ goes positive. The $I_D$ current returns to zero however, prior to the 37.5 degree rotor position where the next energized phase winding (the phase C winding) is energized. By allowing the current in the short-pitched damping winding to drop to zero before the next energized phase winding is energized the average value of the flux-linkage remains relatively constant. This is important because, if the $I_D$ current was not allowed to drop to zero between successive phase energizations, there is a possibility that the current in and the flux-linkage of the short-pitched damping winding would increase or accumulate to a point that the machine would be damaged.

Figure 5A:
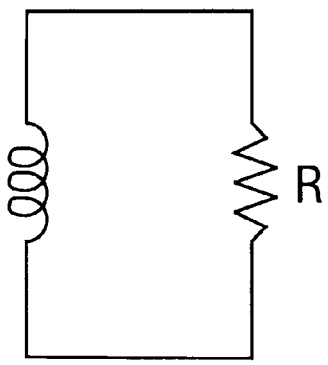
FIGS. 5A–5D illustrate alternate embodiments of the present invention where energy absorption or storage elements are coupled to a damping winding.
Figure 5B:
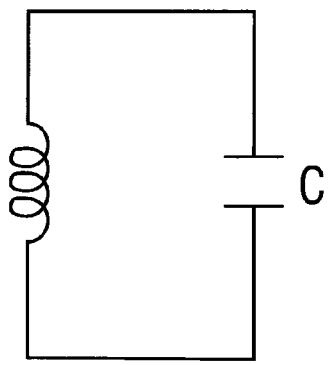
Figure 5C:
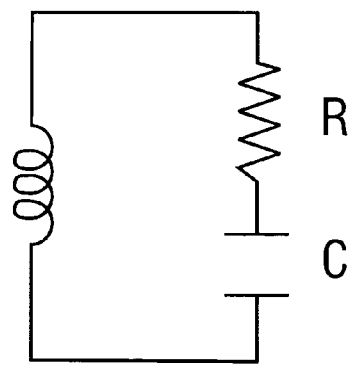
Figure 5D:
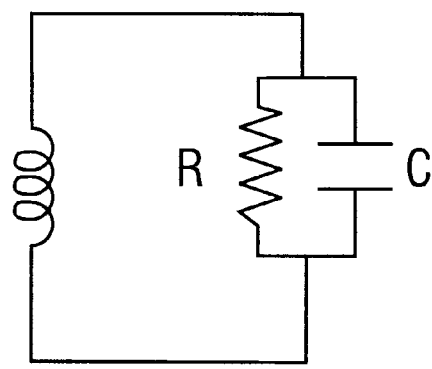

In certain embodiments of the present invention, the time constant of the damping winding, e.g., the rate at which the damping winding current changes from negative or zero to positive and then back to zero or negative, may be controlled to ensure that the previously described optimum operating conditions are met. In such embodiments, energy absorbing or storage devices may be coupled in series with the damping winding to provide for a proper time constant (e.g., the rate of current rise and fall) and to facilitate energy transfer to and from the winding. One example is provided in FIG. 5A which shows the use of an additional resistor R coupled in series with the damping winding to absorb any excessive energy. For purposes of FIGS. 5A–5D the damping winding is schematically illustrated as a single inductive coil although the damping winding will actually comprise one or more coupled coils positioned within the stator. The use of such a resistor can decrease the time constant of the damping winding while maintaining the turn ratio high enough to provide adequate mutual coupling between the coils of the damping winding and the coils of the main phase winding. FIG. 5B illustrates an alternate embodiment where a capacitor C is coupled in series with the phase winding to provide a temporary energy storage device in the damping winding. The capacitor is charged and discharged with alternating current flowing in the damping winding and can be used to adjust the time constant of the damping winding. FIG. 5C illustrates a third embodiment where a resistor R and a capacitor C are both coupled in series with the damping winding to control the time constant of the winding. FIG. 5D illustrates a fourth embodiment where a resistor R and a capacitor C are coupled in parallel and the parallel connection of R and C is coupled in series with the damping winding to control the time constant of the winding.

It should be noted that the waveforms for FIGS. 3A, 3B, 4A and 4B represent optimized waveforms of the appropriate reluctance machines. Also, the values provided for the self-inductances and flux-linkages have been scaled to fit on the same plot as the current and the values provided refer to the current of the various phase windings in amps. Those of ordinary skill in the art will appreciate that the current, self-inductance, and flux-linkage waveforms, as well as the vibration characteristics of an actual machine may differ from those provided in the discussed Figures.

As a comparison of the waveforms for the conventional machine (FIGS. 3A and 3B) with those of a machine constructed according to the teachings of the present invention (FIGS. 4A and 4B) illustrate, the machine of the present invention provides for significantly improved vibration characteristics. Both before and after the current commutation points, the variations in the flux densities on the stator poles due to the current choppings and commutation have been softened, since the flux linkage of the damping winding, which is reluctant to change without external voltage forcing, tends to counter any rapid changes in the flux densities. As a result, the variations in the radial forces, which are generally proportional to the square of the flux densities, have been reduced. Moreover, the peak radial forces applied to the stator poles of a machine constructed according to the teaching of the present invention are generally lower than those applied to the stator poles of a conventional machine of the same size, operating with the same control and the same speed. Even though the rate of change in the main winding flux linkage of the machine of the present invention is similar to that of a similarly sized and operated conventional machine of the same external voltages the magnitude and duration of the force excursions are reduced.

Still further, although it is not particularly pronounced at the relatively low rotational speed corresponding to FIGS. 3A–4B, it may be noted that the rates of the rise and fall of the currents in the phase windings are greater in the machine of the present invention (FIGS. 4A and 4B) than in the conventional machine (FIGS. 3A and 3B). Thus, with a machine constructed in accordance with the teachings of the present invention, the phase currents can be designed and controlled to have a shape closer to the ideal square waveforms than that was previously possible. Such "squarer" waveforms make fuller use of available torque capacity normally wasted in conventional machines. This aspect of the present invention, although existent at low rotational speeds, becomes more pronounced at high rotational speeds when the current commutation problem becomes more restricting.

As those of ordinary skill in the art will appreciate and as mentioned before, as the angular speed of the motor increases, a point is reached where there is insufficient time and too much back-EMF for more than a single pulse of current to occur or a certain desirable current magnitude to be reached during each phase period. Accordingly, at these speeds, the type of current chopping strategies used at low speeds are generally ineffective. Accordingly, at these relatively high speeds, the torque of the motor is commonly controlled by controlling the position and duration of the voltage pulse applied to the winding during the phase period. Because a single pulse of voltage is applied during each phase period, this form of control is referred to as "single pulse control." Just as the use of a short-pitched damping winding in accordance with the present teachings improves overall performance at low speeds where chopping mode current control is used it improves machine performance at higher speeds where single pulse current control is used. This is especially true because the use of a short-circuited damping winding as disclosed herein permits faster phase current rise and fall times, which are important in single-pulse mode control.

Figure 6A:
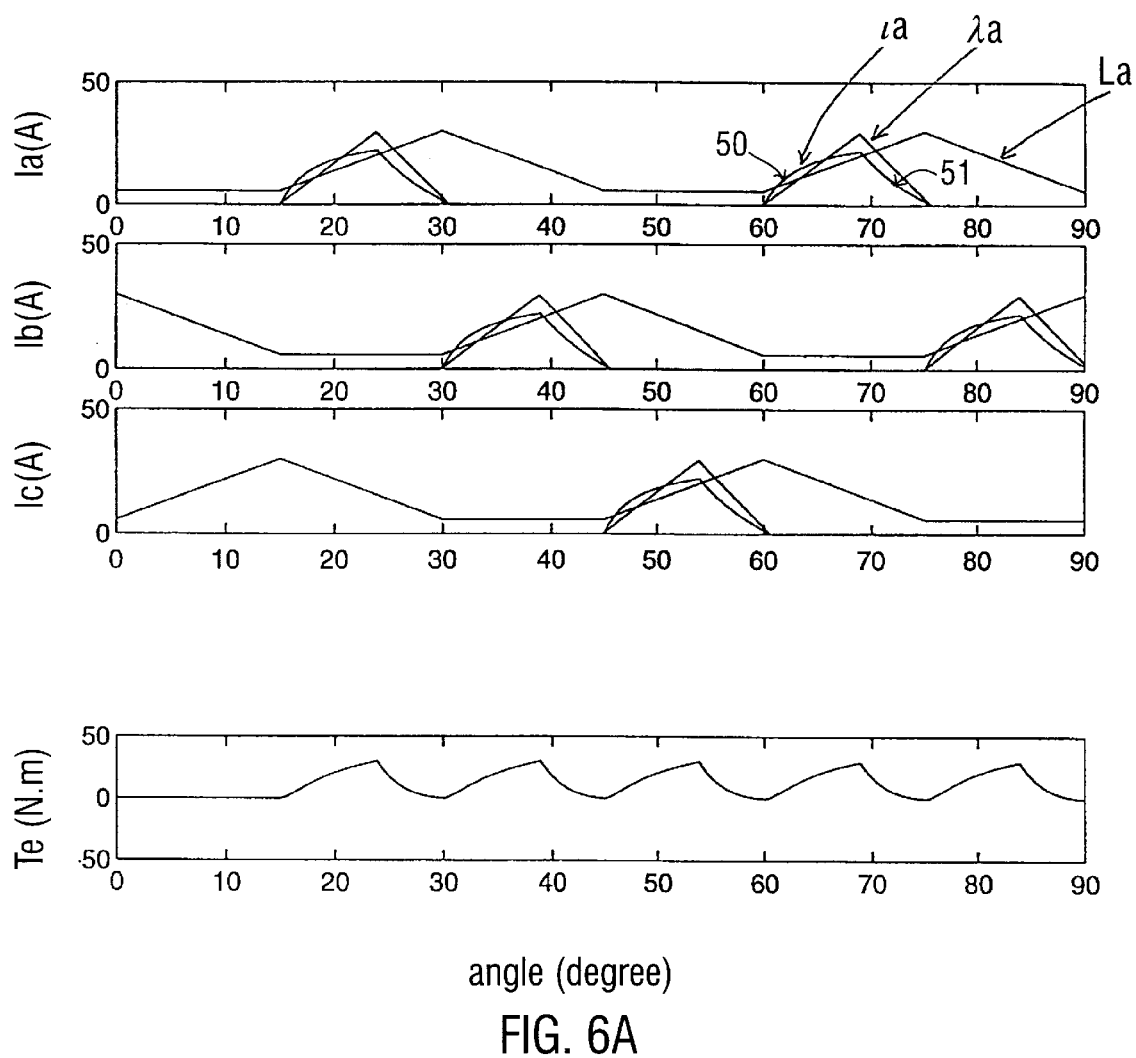
FIG. 6A illustrates the phase currents $I_A$, $I_B$ and $I_C$; the self-inductances $L_A$, $L_B$ and $L_C$; and the flux-linkages $\lambda_A$, $\lambda_B$, and $\lambda_C$ for the same conventional twelve-stator pole, eight-rotor pole machine whose operating characteristics are reflected in FIGS. 3A and 3B.

FIG. 6A illustrates the phase currents, $I_A$, $I_B$ and $I_C$; the self-inductances $L_A$, $L_B$ and $L_C$; and the flux-linkages $\lambda_A$, $\lambda_B$, and $\lambda_C$ for the same conventional twelve-stator pole, eight-rotor pole machine whose operating characteristics are reflected in FIGS. 3A and 3B. In FIG. 6A, however, the conventional machine is operated in the single pulse mode (for phase A on at 15 degrees, off at 24 degrees, on at 60 degrees and off at 69 degrees, other phases displaced from phase A) at a rotational speed of 1500 rpm.

Referring to FIG. 6A it may be noted that the current pulses applied to the machine do not approach the ideal square pulse, but instead have slowly-rising front portions and gradually falling tail portions. For example, the current pulse applied to the phase A winding generally between rotor positions 60 degrees and 69 degrees has a slowly rising front-end 50 and a gradually falling tail portion 51. The same slow-rising front end and gradually falling tail are associated with the other current pulses applied to the other phase windings.

The slow-rising and slow-falling current pulses associated with the machine of FIG. 6A limit the output torque production of the machine. This limitation occurs, in large part, because the torque output of the machine corresponds to the magnitude of the phase current and the phase current in the machine FIG. 6A does not quickly reach and maintain a desired peak current value. It may be noted that the average torque output Te of the machine of FIG. 6A is 13.4 Nm.

Figure 6B:
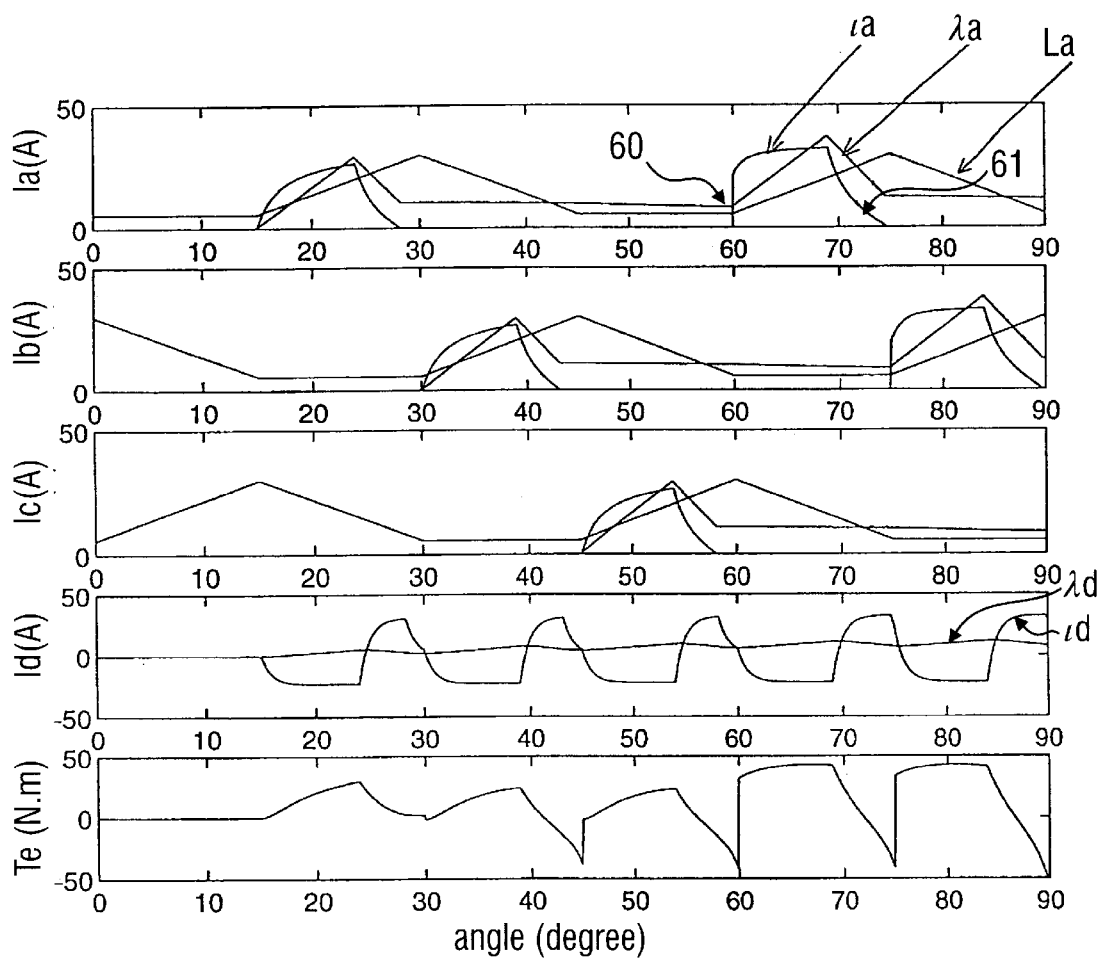
FIG. 6B illustrates the phase currents, $I_A$, $I_B$ and $I_C$; the self-inductances $L_A$, $L_B$ and $L_C$; the flux-linkages $\lambda_A$, $\lambda_B$, and $\lambda_C$; and the torque output Te of the twelve-stator pole, eight rotor pole reluctance machine reflected in FIGS. 4A and 4B utilizing short-pitched damping winding in accordance with the teachings of the present invention.

FIG. 6B illustrates the phase currents, $I_A$, $I_B$ and $I_C$; the self-inductances $L_A$, $L_B$ and $L_C$; the flux-linkages $\lambda_A$, $\lambda_B$ and $\lambda_C$; and the torque output Te of the twelve-stator pole, eight rotor pole reluctance machine reflected in FIGS. 4A and 4B utilizing short-pitched damping winding in accordance with the teachings of the present invention. The operating speed of the motor is 1500 rpm and the same control angles as were used for the conventional machine of FIG. 6A are used for the machine having short-pitched damping winding of FIG. 6B. The resistance of the damping winding (5 ohms) and the ratio of the turns in a damping winding coil to the turns in a main phase coil (0.2) are the same as for the machine of FIGS. 4A and 4B.

Turning to FIG. 6B, it may be noted that, after energy is stored in the damping winding and current $I_D$ is established in the damping winding, the current commutation occurs much more rapidly than in conventional machines and the rise and fall times for the current pulses in the machine in accordance with the present invention are much less than those associated with conventional machines. For example, the current pulse applied to the phase A winding between the 60 degree and 69 degree rotor positions has a very steep rise portion 60 and a quickly falling tail portion 61. Comparing this current pulse with the corresponding current pulse in the conventional machine of FIG. 6A, it may be noted that the current pulse defined by rise 60 and fall 61 has a waveshape that is much closer to the ideal square waveshape than that associated with the conventional machine reflected in FIG. 6A.

The improved current waveshapes associated with the machine of the present invention using short-pitched damping winding result in greater output torque since torque production capability wasted in conventional machines is used in the machine of the present invention. This is reflected by a comparison of the output torque waveforms Te of FIGS. 6A and 6B. The average torque output of the machine constructed in accordance with teachings of the present invention in FIG. 6B has an average torque output of 23.1 Nm, which is 72% greater than the 13.4 Nm average output of the conventional machine reflected in FIG. 6A.

As reflected above, the machine of the present invention provides greater output torque than conventional machines under similar operating conditions. Alternately, a machine of the present invention could be used to produce the same amount of torque as a conventional machine but the efficiency of the machine constructed according to the teaching of the present invention would be greater.

A further attribute of the present invention is reflected by the current waveform $I_D$ for the damping winding in FIG. 6B. As reflected in FIG. 6B, the current $I_D$ in the damping winding cycles during operation of the machine between positive and negative values. The presence of this positive and negative current $I_D$ in the damping winding reflects the storage of energy in the damping winding over the entire operating cycle of the machine. This retained energy is used to assist the commutation of the next active phase (hence the faster current rise times) and is not circulated back to the power converter. This storage of energy in the damping winding, thus, can reduce the volt-amp rating of the power converter and the size of the required DC bus (DC link) capacitor.

Figure 7:
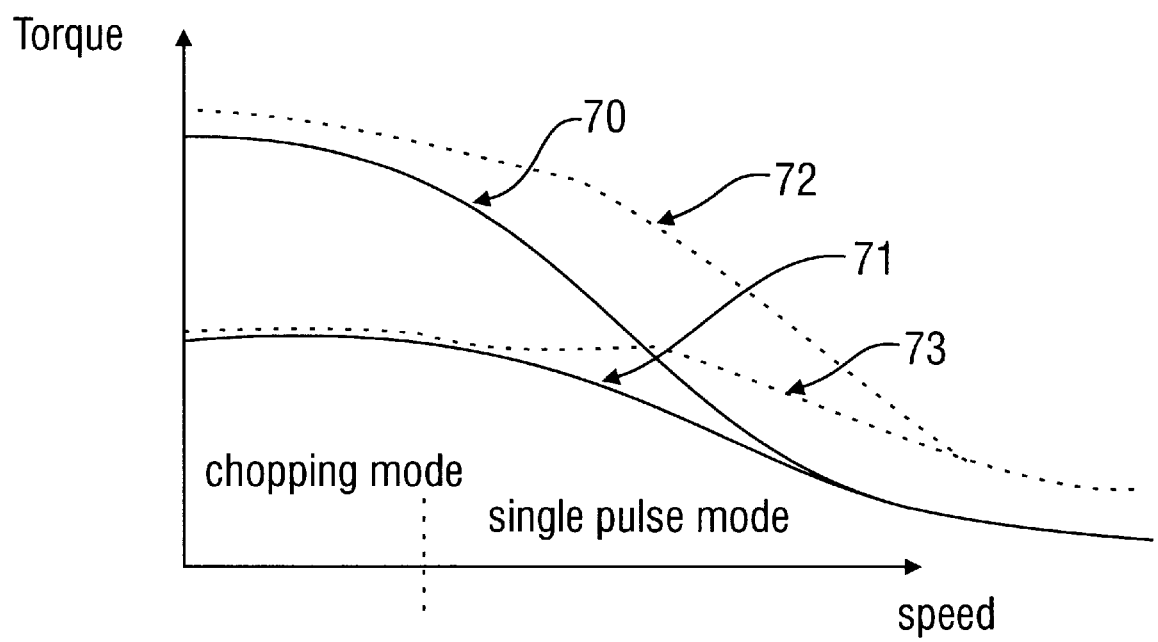
FIG. 7 illustrates the peak (or short duration) torque output of a conventional reluctance machine as a function of rotor speed, the continuous (or thermal) torque output of a conventional machine as a function of speed; the peak torque output of a reluctance machine using damping windings in accordance with the present invention as a function of rotor speed; and the continuous torque output of a machine using damping windings in accordance with the present invention as a function of speed.

The increase in the torque output of the reluctance machine resulting in the use of short-pitched damping winding in accordance with the present invention is further reflected by FIG. 7. FIG. 7 illustrates the peak (or short duration) torque output of a conventional reluctance machine as a function of rotor speed 70, the continuous (or thermal) torque output of a conventional machine as a function of speed 71; the peak torque output of a reluctance machine using damping windings in accordance with the present invention as a function of rotor speed 72; and the continuous torque output of a machine using damping windings in accordance with the present invention as a function of speed 73.

As reflected in FIG. 7, the peak and continuous torque outputs for the machine using damping windings in accordance with the present invention are greater than those for the similarly sized conventional machine at all rotor speeds. Moreover, the differences in torque outputs between the machine of the present invention and the conventional machine are greater at high speeds where current commutation becomes more important and the rise and fall times of the current pulses begins to limit torque production.

Figure 8:
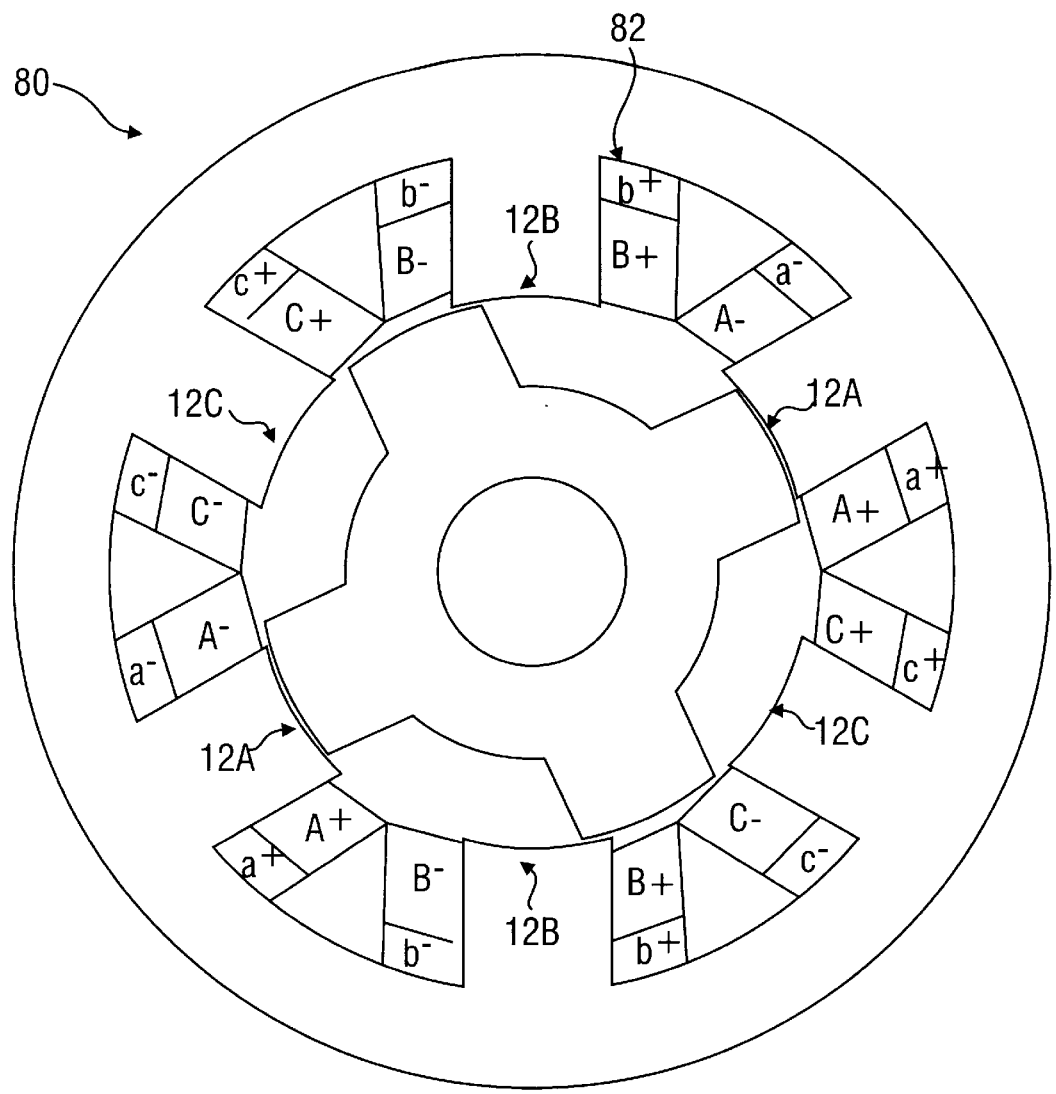
FIG. 8 illustrates a reluctance machine in accordance with the present invention similar the machine of FIG. 1, with the exception being that the coils of the short-pitched damping winding are placed on top of the corresponding coils of the main phase windings.

While the above description was in the context of a machine constructed like machine 10 of FIG. 1, alternate constructions are envisioned. FIG. 8 illustrates one such exemplary embodiment 80. Machine 80 is a reluctance machine similar to that of machine 10 of FIG. 1, with the exception being that the coils of the short-pitched damping winding 82 are placed "on top" of the corresponding coils of the main phase windings. This alternate winding configuration for the damping winding 82 provides the same benefits as does that illustrated in FIG. 1, but may be better suited to particular winding processes.

Figure 9A:
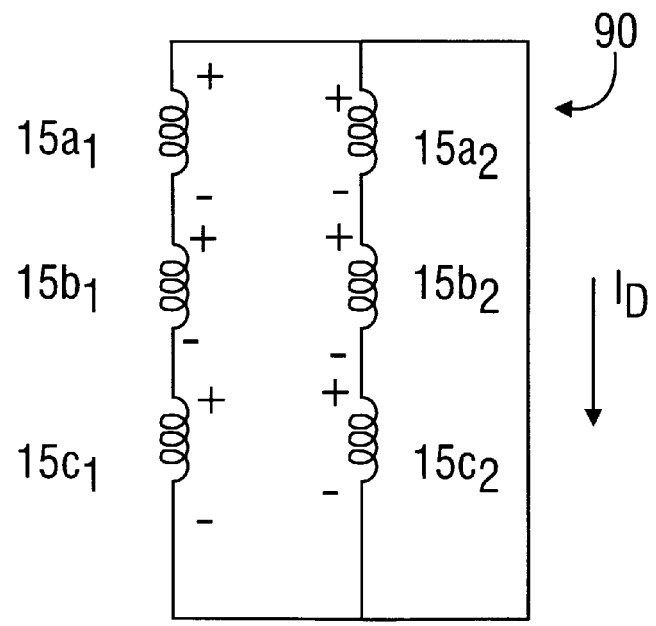
FIGS. 9A and 9B illustrate alternate couplings for the damping coils of the reluctance machine of FIG. 8.
Figure 9B:
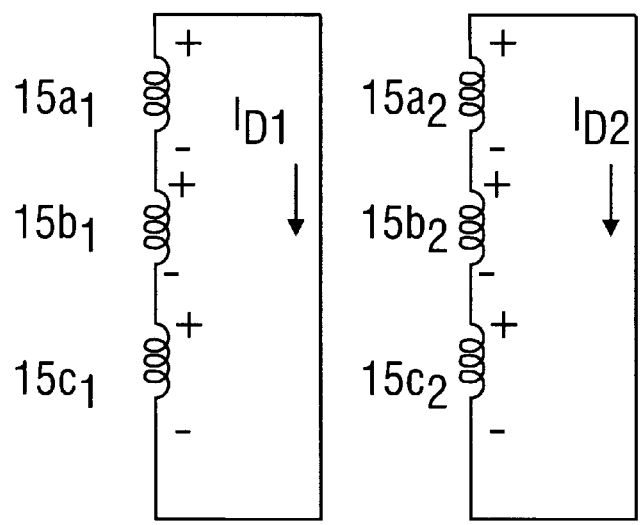

FIGS. 2A and 2B illustrate certain configurations of the short-pitched damping winding for a machine having six stator poles. Alternate configurations are envisioned. For example, FIG. 9A illustrates a configuration where the short-pitched damping coils are all serially connected and shorted together (as in FIG. 2A) but where an additional conductor 90 is provided such that the electrical junction of the damping coils corresponding to phase A (the a damping coils) is electrically connected to the junction of the damping coils corresponding to phase C (the c damping coils). FIG. 9B illustrates a configuration where one of the two damping coils of each phase are serially connected and shorted, as are the rest of the coils for the other phases, and the two sets are separately shorted.

Figure 10:
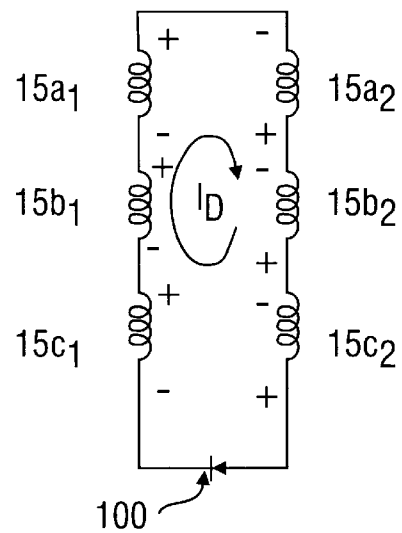
FIG. 10 illustrates an alternate configuration for the damping coils of the reluctance machine of FIG. 8 in which a diode is inserted in a series-connected short-pitched damping winding to inhibit the flow of current in the damping winding in one direction.

FIG. 10 illustrates yet another alternate configuration for the damping coils. In this configuration, a diode 100 is inserted in the series-connected short-pitched damping winding. The use of diode 100 will inhibit the flow of current in the damping winding in one direction, but may be desirable in certain applications.

Figure 11A:
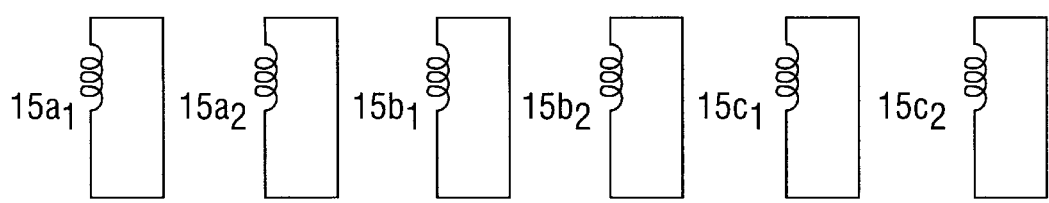
FIGS. 11A–11B illustrate various ways in which damping coils may be connected to form damping windings in accordance with the present invention.
Figure 11B:
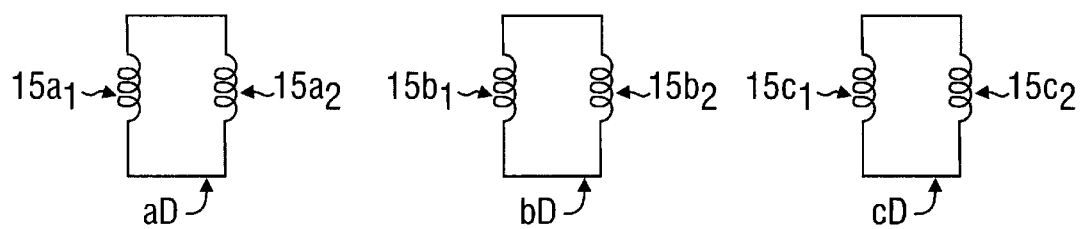

In the embodiments discussed above except the configuration in FIG. 9B, all of the short-pitched damping coils were connected together to form a single damping winding. The configuration in FIG. 9B is also functionally equivalent to a single damping winding. Alternate embodiments are envisioned wherein each of the damping coils is short circuited within itself, or with only one other damping coil to form modified damping windings. Such alternate embodiments are illustrated in FIGS. 11A and 11B. Assuming the same motor structure and damping coils as in the machine 10 of FIG. 1, FIG. 11A illustrates how the individual short-pitched damping coils may be short circuited within themselves to create, six single coil damping windings. The use of such short-pitched damping windings provided advantages similar to those discussed above in connection with the six-coil damping winding.

FIG. 11B illustrates an alternate connection of the six damping coils where the damping coils corresponding to a particular phase are connected together in series. For example, the two coils associated with phase A (the 15a1 and 15a2) coils are connected in series, as are the coils associated with the phase B and phase C windings to form three two-coil short-pitched damping windings aD, bD and cD. While the two damping coils associated with each phase are connected in series in the example of FIG. 11B, for machines having a greater number of stator poles, the damping coils associated with a given phase may be coupled together in series, parallel, or a combination of series and parallel. Again the use of damping windings as reflected in FIG. 11B provided advantages similar to those discussed above in connection with the single six-coil short-pitched damping winding.

Figure 12:
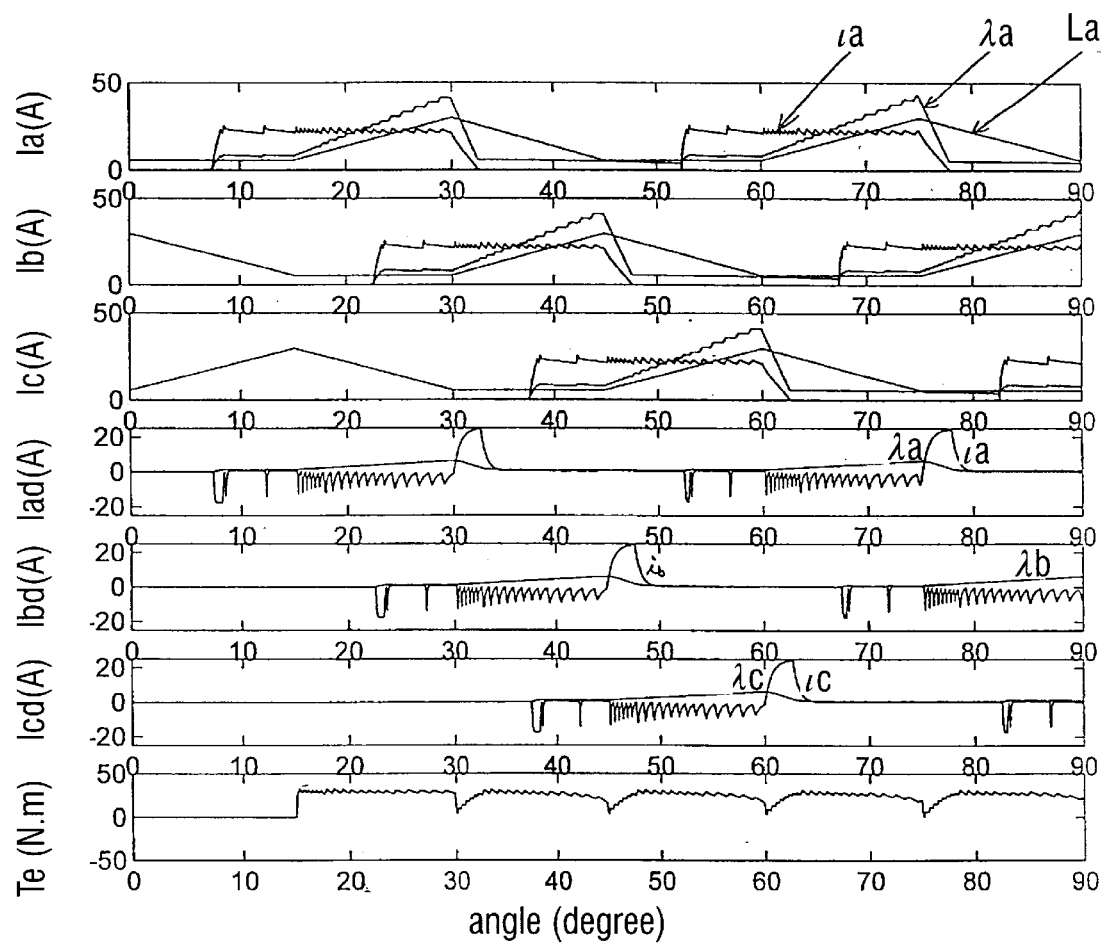
FIG. 12 illustrates the currents I, self-inductances L, and flux linkages $\lambda$ of the three phase windings A, B and C and for the twelve individually shorted short-pitched damping windings (referred to as local damping windings) of a twelve-stator pole, eight rotor-pole machine having damping windings in accordance with FIG. 11A but with twice as many coils.

Operating at 500 rpm and with the same control as explained in FIG. 3A, FIG. 12 illustrates the currents I, self-inductances L, and flux linkages λ of the three phase windings A, B and C and for the twelve individually shorted short-pitched damping windings (referred to as local damping windings) of a twelve-stator pole, eight rotor-pole machine having damping windings in accordance with FIG. 11A but with twice as many coils. As may be noted from a review of the currents in the three short-pitched damping windings 15a1, 15ba and 15c1, the current in each damping winding is generally slightly negative during the interval when positive current is flowing through its associated phase winding and the phase winding is energized (e.g., the periods 7.5 degrees to 30 degrees for phase A) and then jumps to a positive value when the associated phase winding is commutated off. (e.g., the period around 30 degrees for 15a1). The damping winding current remains at this positive value for some time and then returns to zero. The current characteristics for all the three phase damping windings are substantially identical.

Figure 13:
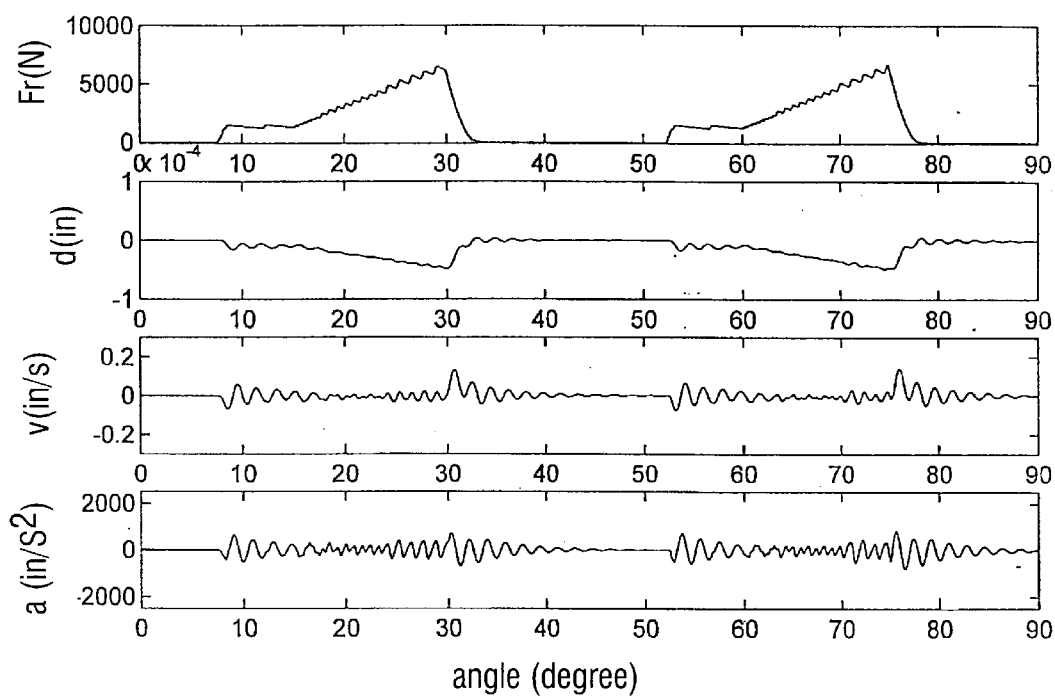
FIG. 13 illustrates the vibration characteristics of the machine modeled in FIG. 12 including the damping windings.

FIG. 13 illustrates the vibration characteristics of the machine modeled in FIG. 12 including the damping windings. As a comparison of FIG. 13 with the vibration characteristics of the conventional machine as reflected in FIG. 3B indicates, the machine with the damping windings has significantly better vibration characteristics and, thus, less unwanted noise and vibration.

Figure 14A:
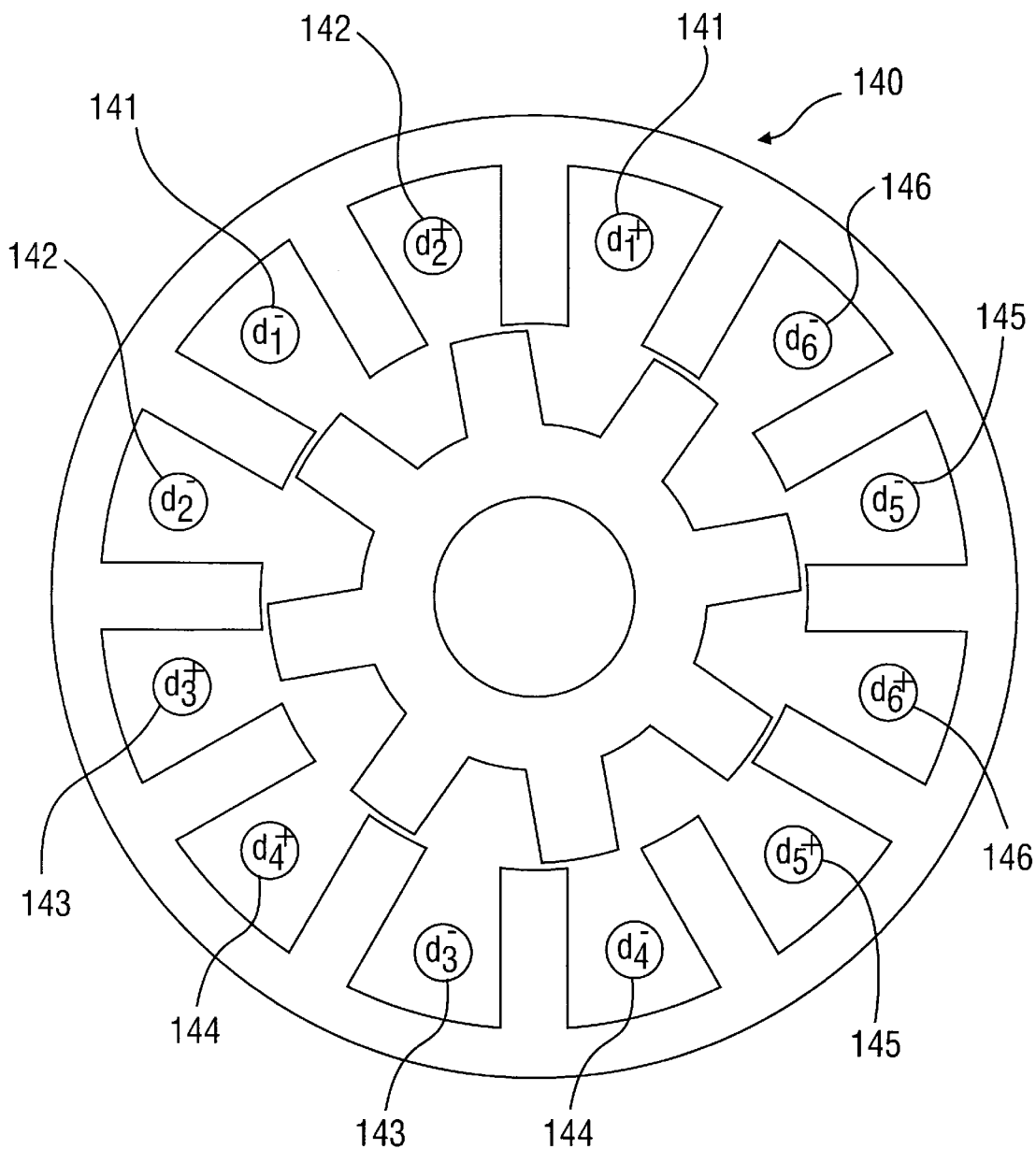
FIGS. 14A–14D illustrate an alternate embodiment of the present invention including a reluctance machine having a plurality of fractionally-pitched damping windings.

While the above discussion focused on the use of a short-pitched damping winding, the teachings of the present invention may also be allowed to machines including fractional-pitched and fully-pitched damping windings. FIG. 14A illustrates twelve-stator pole, eight-rotor pole reluctance machine 140 including damping coils 141, 142, 143, 144, 145, and 146 in accordance with the teachings of the present invention. For purposes of clarity, only the damping windings are illustrated. As FIG. 14A indicates, the damping coils in this embodiment are not "short-pitched" coils in that they do not surround a single stator pole. To the contrary, each damping coil encircles (or spans) two stator poles. For example, damping coil 141 encircles stator teeth 147 and 148. In the particular embodiment of FIG. 14A, the reluctance machine is a three phase machine. Because the number of stator poles encircled by each damping coil is less than the total number of phases for the machine, each damping coil may be referred to as a "fractional-pitched" coil.

Figure 14B:
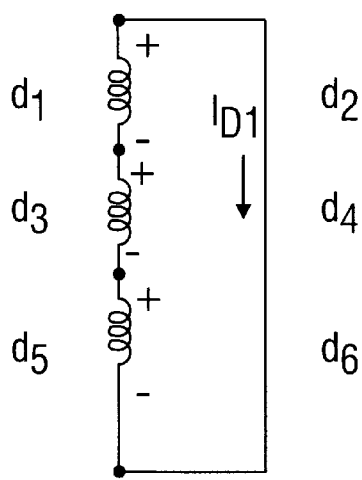
Figure 14C:
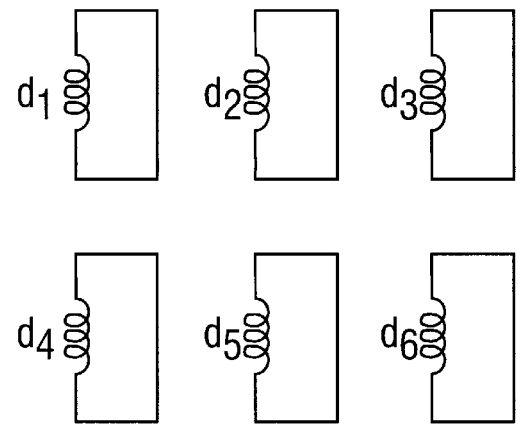
Figure 14D:
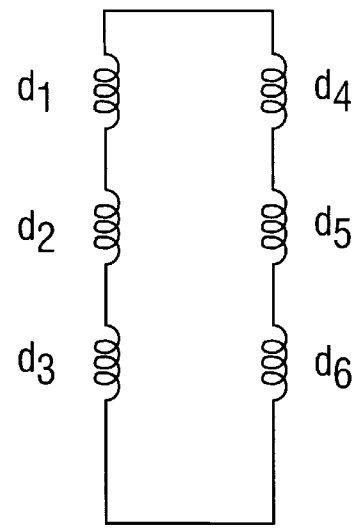

In accordance with the teachings of the present invention, the six fractional-pitched coils may be short-circuited together to form one or more damping windings. FIG. 14B illustrates one exemplary connection where the six coils are coupled together to form two three-coil fractional pitched damping windings. FIG. 14C illustrates another exemplary configuration where each of the fractional pitched damping coils is short circuited with itself to form six fractional-pitched damping coils. FIG. 14D illustrates yet a further embodiment where the six fractional-pitched damping coils are coupled together in series to form a single damping winding. Those of ordinary skill in the art having the benefit of this disclosure will understand that fractional-pitched damping coils can be coupled together in other configurations without departing form the scope and spirit of the present invention.

The fractional-pitched damping coils of FIGS. 14A–14D provide the same general benefits as the short-pitched damping coils previously discussed.

Figure 15A:
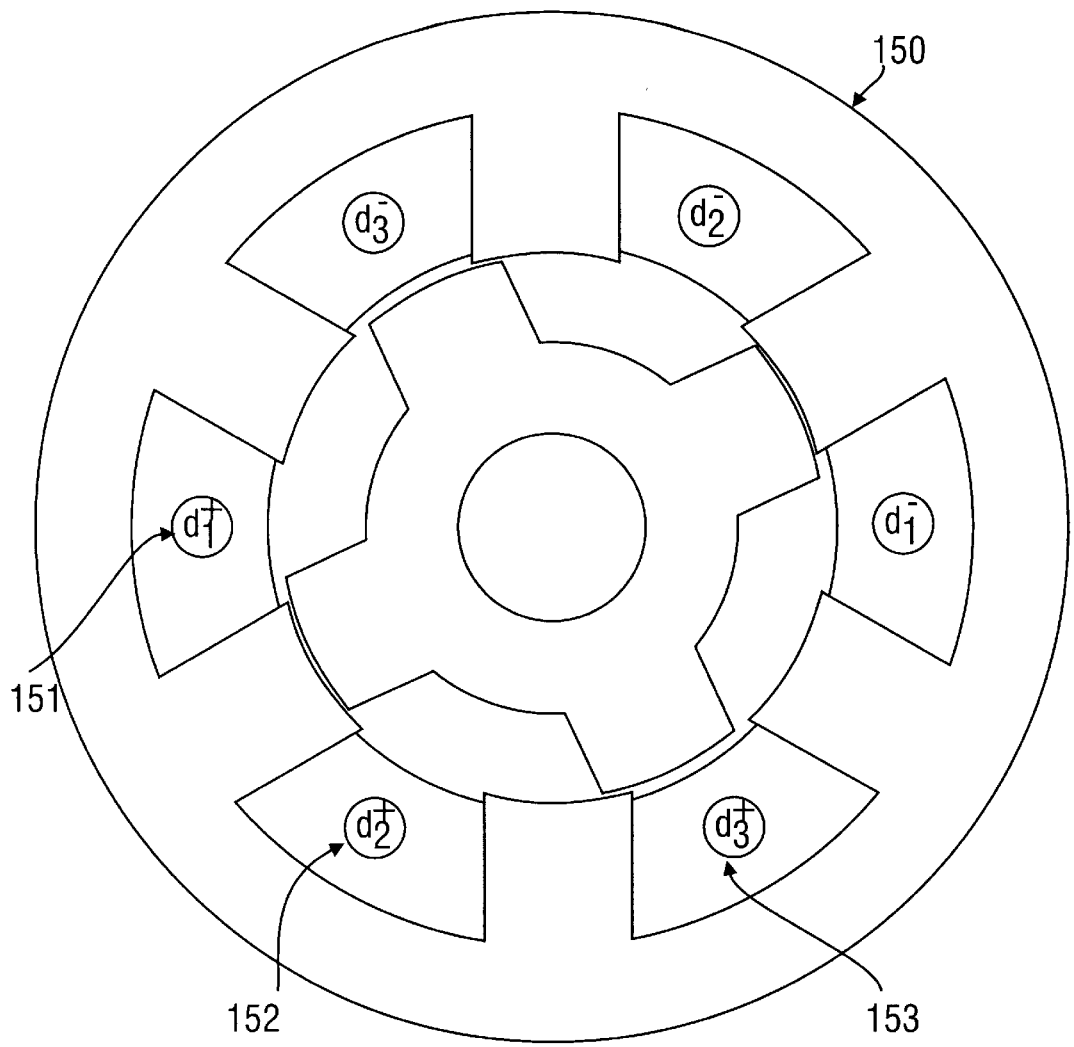
FIGS. 15A–15D illustrate an alternate embodiment of the present invention including a reluctance machine having a plurality of filly-pitched damping windings.

Fully pitched damping coils may also be used to implement the teachings of the present invention. FIG. 15A illustrates a six-stator pole, four-rotor pole reluctance machine 150 having three full-pitched damping coils 151, 152, and 153. Each of the damping coils is "fully-pitched" in that there are three phases for the machine 150 and each damping coil encircles three stator poles (i.e., the number of stator poles encircled by each damping coil is equal to the total number of phases). Again, for purposes of clarity, the main phase windings are not illustrated.

Figure 15B:
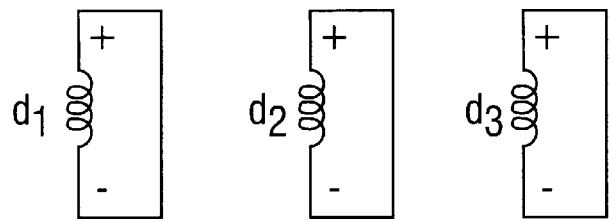
Figure 15C:
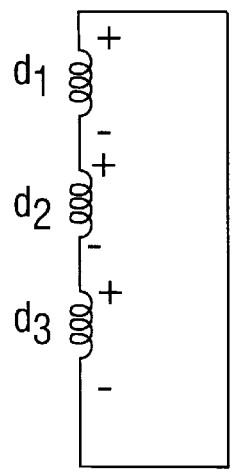
Figure 15D:
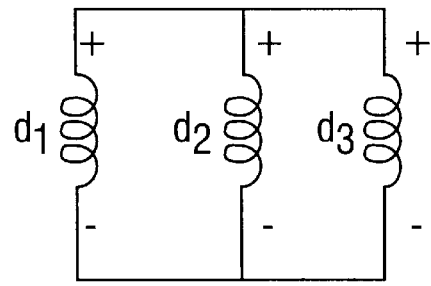

The three fully-pitched damping coils 151, 152 and 153 of FIG. 15A may be coupled together in various ways to form one or more damping windings. FIG. 15B illustrates an embodiment where each damping coil is short circuited with itself to form three single-coil fully-pitched damping windings. FIG. 15C illustrates an alternate embodiment where a single, three-coil, fully-pitched damping winding is formed by coupling the three damping coils in series. And FIG. 15D illustrates yet another embodiment where a single, three-coil, damping winding is formed by coupling the three damping windings in parallel. Those of ordinary skill in the art having the benefit of this disclosure will recognize that other couplings of multiple fully-pitched damping coils are possible and would not depart from the scope or spirit of the present invention.

It is possible to construct a reluctance machine utilizing only a single fully-pitched damping coil and obtain the benefits of the present invention. The single fully-pitched damping coil, however, must be configured such that positive and negative current can flow through the single fully-pitched damping coil during normal operation. One such embodiment is generally illustrated in FIG. 16A and 16B.

Figure 16A:
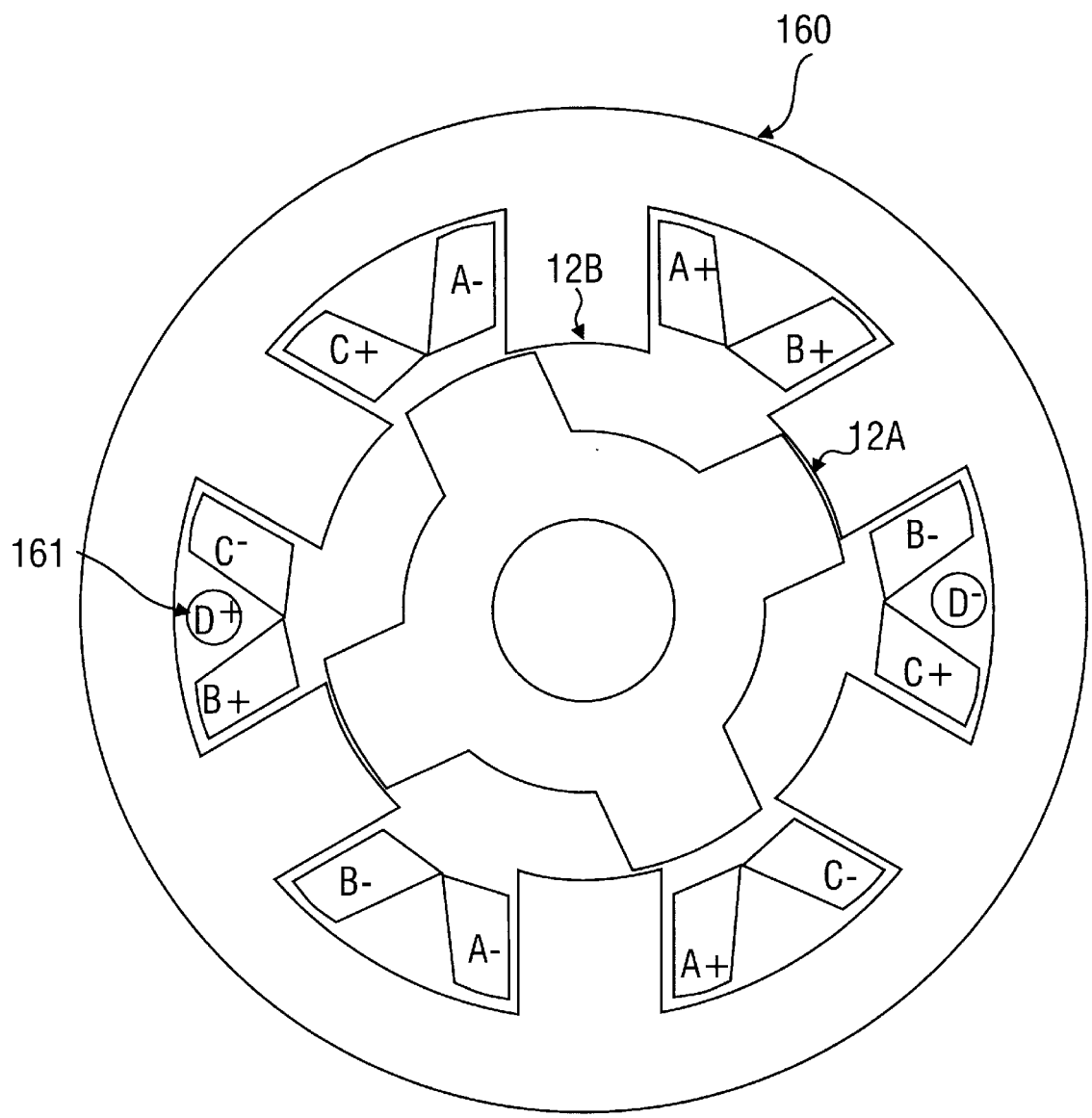
FIGS. 16A–16B illustrate yet another alternate embodiment of the present invention including a reluctance machine having a single fully-pitched damping winding, where the damping winding is adapted to allow for current flow in both a positive and a negative direction.
Figure 16B:
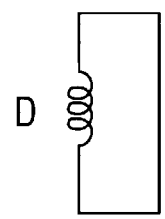

FIG. 16A illustrates a three-phase reluctance machine 160 having six stator poles and four rotor poles. Positioned about the stator poles are three phase windings A, B and C. Also positioned within the stator is a single, short-circuited, fully pitched damping coil 161. The configuration of the damping coil is reflected in FIG. 16B. As reflected in FIG. 16B, the ends of the damping coil 161 are short-circuited together such that there is no impediment to the establishment of both positive and negative current in phase winding. Thus use of such a single fully-pitched damping coil can provide improved machine performance in terms of reduced noise and increased torque and efficiency as described above.

The provision of a single fully-pitched damping winding that is capable of carrying both positive and negative current provides for a reduced noise machine. This is because the establishment of negative current in the fully-pitched damping winding during intervals of active phase energization (e.g., during the flux-linkage rising period before current commutation) both: (i) provides a "damping" to reduce unwanted machine noise and vibration; and (ii) stores energy in the damping winding during these intervals that would otherwise be returned to the power converter.

The importance of allowing both positive and negative current to flow in a single fully-pitched damping winding in accordance with certain aspects of the present invention (as well as short-pitched and fractional-pitched damping winding) may be appreciated by understanding that the presence of such negative current tends to slow down the rise in the total flux passing through an active stator pole. This "damping" of the total flux rise tends to slow down the rise in amplitude of the radial force pulling on the active stator poles and also tends to reduce the maximum amplitude of such radial forces. Moreover, in the current chopping mode (where there are current choppings that cause minor rises and falls of the radial forces as the current is chopped) this "damping" of flux changes softens and reduces the changes in the flux passing through the active stator poles, thus resulting in reduced mechanical vibrations, even before current commutation occurs. This aspect of the present invention is generally illustrated in FIGS. 17 and 18A–18B.

Figure 17:
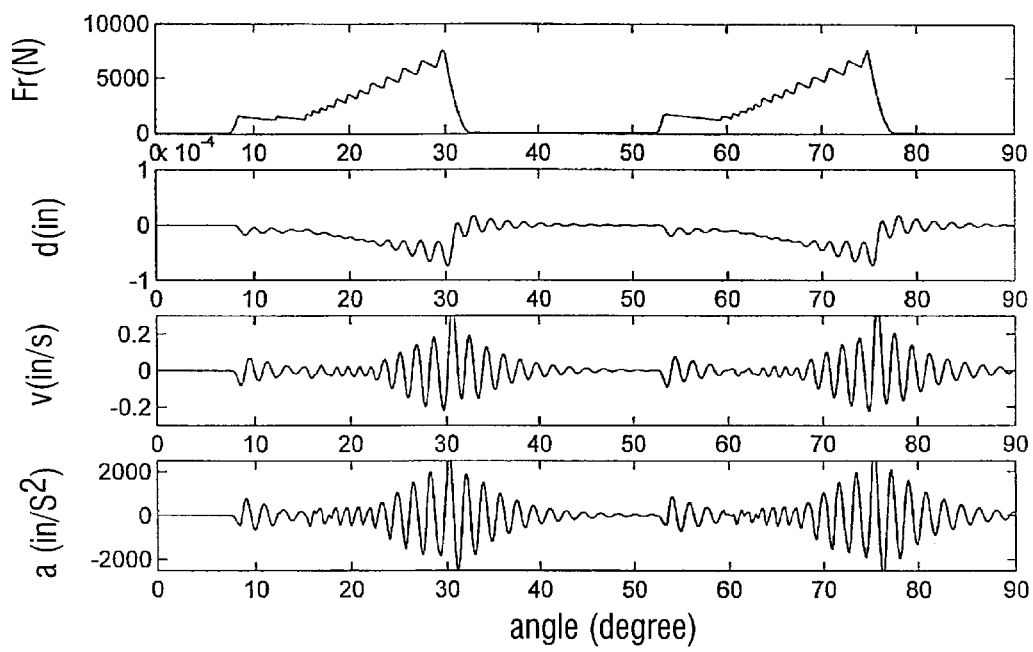
FIG. 17 generally illustrates the radial forces that would be generated for a stator pole of a conventional reluctance machine.

FIG. 17 generally illustrates the radial forces that would be generated for a stator pole of a conventional reluctance machine that does not include a single, fully-pitched damping winding in accordance with the present invention that allows for the flow of both positive and negative current. The forces illustrated in FIG. 17 are, for illustrative purposes, limited to those generated by the current in only one phase winding. In general, it may be noted that the changes in the radial forces have relatively steep rises and falls during the active periods of the associated phase winding (e.g., between 7.5 and 30 degrees and between 52.5 and 75 degrees) and that the radial force reaches a relatively high peak value at the commutation points (e.g., the 30 and 75 degree points). These abrupt changes in the radial forces produce significant mechanical vibration of the stator as reflected in the vibration characteristic data of FIG. 17, thus producing unwanted noise and vibration.

Figure 18A:
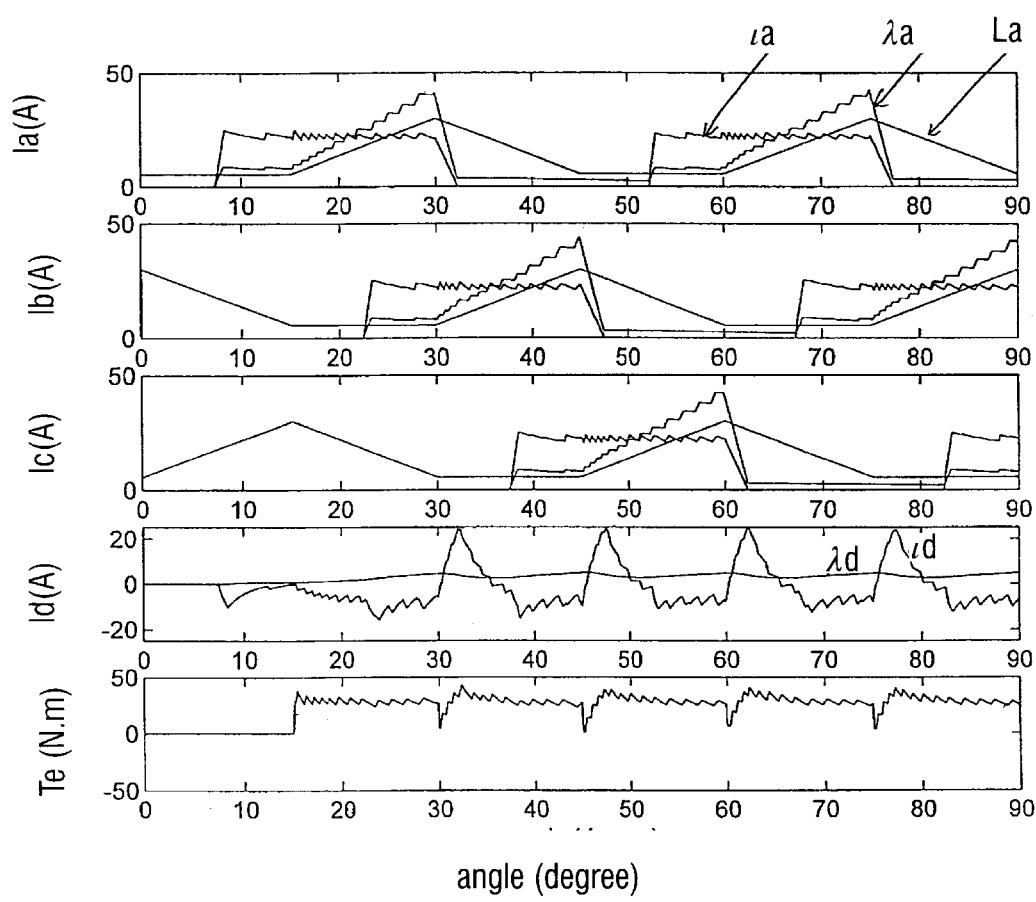
FIG. 18A illustrates the phase and damping winding currents, output torque, self-inductances and flux linkages for a reluctance machine having a single fully-pitched damping winding in accordance with the present invention.

FIG. 18A illustrates the phase and damping winding currents, output torque, self-inductances and flux linkages for a reluctance machine having a single fully-pitched damping winding in accordance with the present invention. In the illustrated example, the single fully-pitched damping winding has eight turns and a total resistance of approximately 2 ohms. As reflected in the waveform corresponding to the current in the damping winding ID, the damping winding current is generally negative but rises to a positive value during the intervals when a phase winding is being commutated off.

Figure 18B:
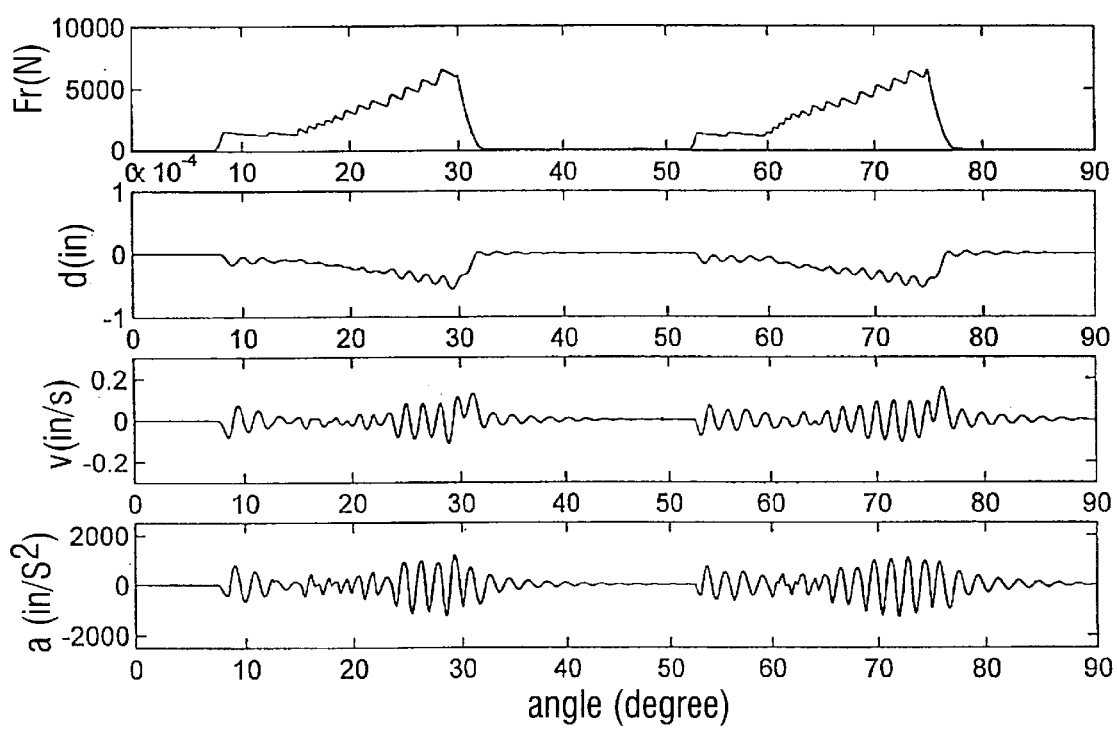
FIG. 18B illustrates the radial forces produced by the energization of one phase winding of the machine reflected in FIG. 18A. It also illustrates the resulting vibration characteristics.

FIG. 18B illustrates the radial forces produced by the energization of one phase winding of the machine reflected in FIG. 18A. It also illustrates the resulting vibration characteristics. As may be noted from a comparison of the force waveforms between FIGS. 17 and 18A, the changes in the radial forces over the active chopping periods are less abrupt and have slow rise and fall times in the inventive machine of FIG. 18A than they do for the conventional machine of FIG. 17. Moreover, the peak force (which occurs just prior to commutation) is less for the machine of the present invention than it is for the conventional machine reflected in FIG. 17. Still further, after the current commutation points, the rate of the decrease of the radial forces is softened due to the slower rate of decrease of the flux through the de-energized stator poles thanks to the induced damping current which is now in the reverse direction. This reduction in abrupt force changes during active chopping, the reduction in the peak radial force, and reduction in force changes after current commutation significantly reduces the overall vibration of the machine as may be noted by comparing the vibration characteristics of the machine of FIG. 17 with that of FIG. 18A.

While the above discussion focused on the use of fractional and fully-pitched damping windings, the short-pitched damping winding is believed to be best suited for many applications because: (i) the use of short-pitched windings provides better mutual coupling between the coils of the damping winding and the coils of the phase winding than do fractional and fully-pitched windings; and (ii) the use of short-pitched windings provides better and more distributed contact between the coils of the damping winding and the stator iron thus providing for better and more distributed heat dissipation than occurs with fractional or fully-pitched damping windings. Moreover the end-turns of the short-pitched coils are shorter than those of fractional or fully-pitched coils, resulting in less required copper and less ohmic loss.

The damping effect resulting from the use of short-pitched, fractional-pitched or short-circuited full-pitched (without a diode) damping windings may also be partially produced through the use of damping circuits placed about or within the rotor of a switched reluctance machine. This aspect of the present invention is illustrated in FIGS. 19 and 20A–20B.

Figure 19:
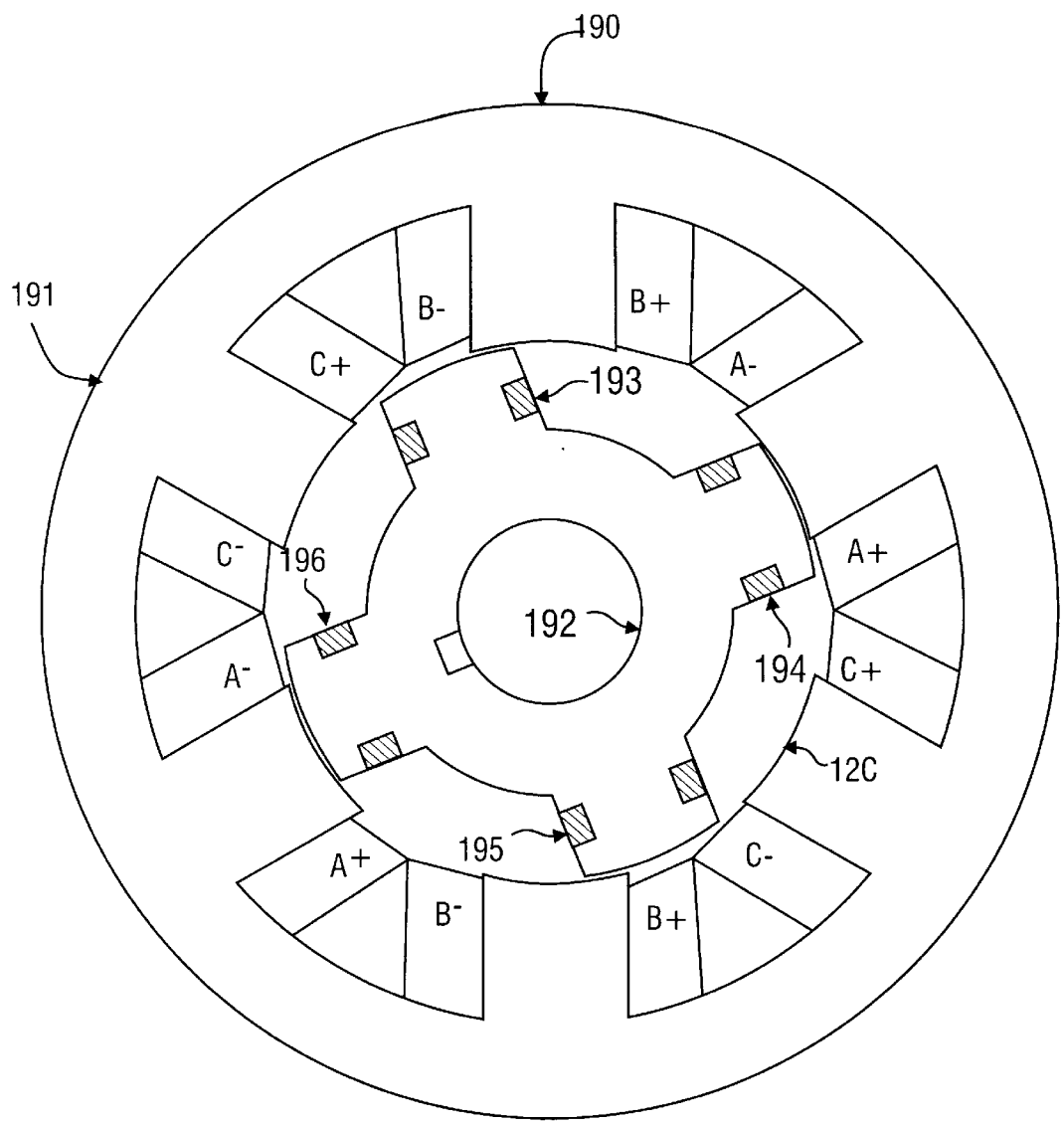
FIG. 19 illustrates an alternate embodiment of the present invention including a reluctance machine having a stator and a rotor, where the rotor includes a damping circuit.
Figure 20A:
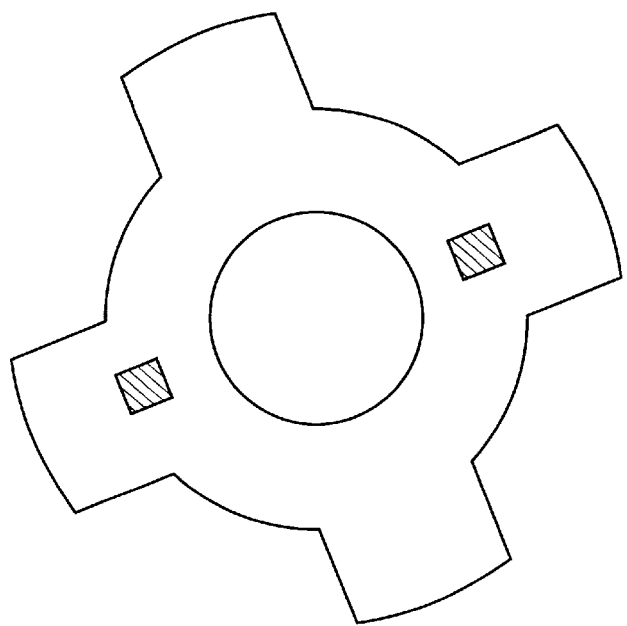
FIGS. 20A and 20B illustrate exemplary alternate constructions of the damping circuit illustrated in FIG. 19.
Figure 20B:
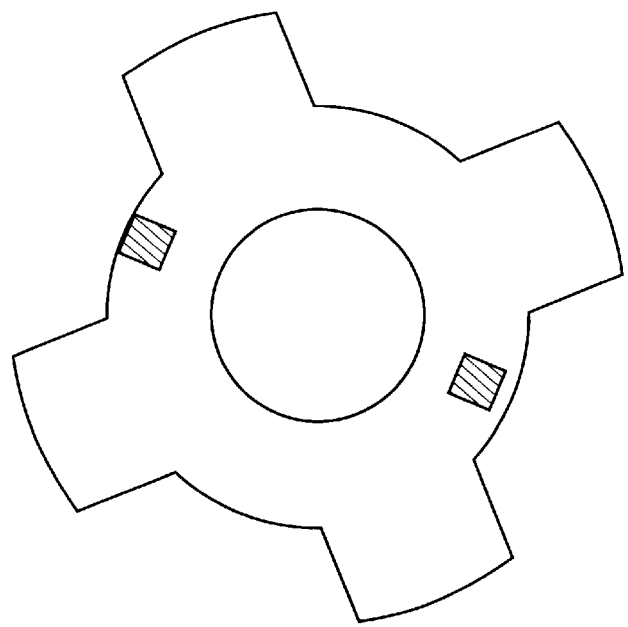

FIG. 19 illustrates a three-phase reluctance machine 190 including a six-pole stator 191 and a four-pole rotor 192 positioned within the stator. Three phase windings A, B and C are positioned within the stator in a conventional fashion. Positioned about each pole of the four pole rotor are damping windings 193, 194, 195 and 196. Each of the damping windings comprises a single coil wound about the rotor pole. In operation the damping windings about the rotor poles tend to absorb energy in a manner similar to that previously described above in connection with the damping windings positioned within the stator.

It will be apparent to those of ordinary skill in the art that rotor pole damping windings as illustrated in FIG. 19 may be positioned around fewer than all of the rotor poles and that the damping windings may be interconnected to form one or more main damping windings. Further, electrically conductive bars (e.g., of copper or aluminum) may be formed or placed into the rotor poles and then shorted at the ends to produce the rotor damping windings.

It is not essential to the present invention that the rotor damping windings be placed around the rotor poles. One or more damping windings may be formed within the rotor yoke or in the inter-pole gaps between the rotor poles. Exemplary figures reflecting these embodiments are provided in FIG. 20A (which reflects the embodiment with the rotor damping winding formed within the rotor yoke) and FIG. 20B (which reflects the embodiment with the rotor damping winding formed within the inter-pole regions of the rotor). The embodiments of FIGS. 19, 20A and 20B are particularly suited to the use of shorted conductive bars to form the rotor damping windings.

The above description of several exemplary embodiments is made by way of example and not for purposes of limitation. Many variations may be made to the embodiments and methods disclosed herein without departing from the scope and spirit of the present invention. The present invention is intended to be limited only by the scope and spirit of the following claims.

I claim as my invention:

1. A reluctance machine comprising:

a stator, the stator defining a plurality of stator poles a rotor, the rotor defining a plurality of rotor poles, and the rotor being positioned to rotate with respect to the stator;

a plurality of phase windings positioned within the stator, wherein each phase winding includes a plurality of phase winding coils and where each stator pole is surrounded by one of the phase winding coils; and a plurality of damping coils positioned within the stator, wherein each damping coil is associated with one phase winding coil such that each damping coil encircles the same stator pole as its associated phase winding coil, and wherein each damping coil is included in a circuit forming a closed current loop that does not include any of the phase windings.

2. The reluctance machine of claim 1 wherein the plurality of damping coils are electrically connected to form a plurality of damping windings where each damping winding forms a closed current loop.

3. The reluctance machine of claim 1 wherein each circuit forming a closed current loop does not include any rectifying devices and, thus, allows for current flow in two directions.

4. The reluctance machine of claim 1 wherein each phase winding coil has a first predetermined number of coil turns, wherein each damping coil has a second predetermined number of turns and wherein the ratio of the number of turns of each damping coil to the number of turns of each phase winding coil is approximately 0.2.

5. A reluctance machine comprising:

a stator, the stator defining a plurality of stator poles and inter-pole slots;

a rotor, the rotor defining a plurality of rotor poles, and the rotor being positioned to rotate with respect to the stator;

a plurality of phase windings positioned within the stator; and a plurality of damping windings positioned within the stator, wherein each damping winding comprises a plurality of damping coils, wherein each damping coil surrounds a plurality of stator poles, wherein each damping winding forms a closed current loop, and wherein each stator slot includes a portion of at least one damping coil.

6. The reluctance machine of claim 5 wherein each damping coil is a fully-pitched coil.

7. A reluctance machine comprising:

a stator, the stator defining a given number of stator poles;

a rotor, the rotor defining a plurality of rotor poles the rotor being position to rotate with respect to the stator;

a plurality of phase windings positioned about the stator; and a plurality of damping coils positioned about the poles of the stator, wherein each stator pole is surrounded by one of the damping coils, and wherein each damping coil is included in a circuit forming a closed current loop that does not include any of the phase windings.

8. The reluctance machine of claim 7 wherein all of the damping coils are coupled in series to form a single damping winding.

9. The reluctance machine of claim 8 wherein the stator defines six stator poles and wherein the single damping winding comprises six damping coils.

10. The reluctance machine of claim 7 wherein at least two damping coils are associated with each phase winding, wherein all of the damping coils associated with a given phase winding are electrically coupled in parallel and where the parallel couplings of all the damping coils are connected in series to form a single damping winding.

11. The reluctance machine of claim 7 wherein each damping coil is short-circuited to itself, such that the plurality of damping coils form a plurality of damping windings.

12. The reluctance machine of claim 7 wherein each damping coil is associated with a phase winding and wherein all of the damping coils associated with a given phase winding are electrically connected together and short-circuited to form one damping winding for each phase winding.

13. A reluctance machine comprising:
    a stator, the stator defining a given number of stator poles and a plurality of inter-pole slots;
    a rotor, the rotor being positioned to rotate with respect to the stator;
    at least one phase winding positioned about the stator; and
    at least one damping winding positioned about the poles of the stator, where the damping winding includes a plurality of damping coils, wherein each stator slot includes a portion of a damping coil and wherein the damping winding forms a closed current loop.

14. The reluctance machine of claim 13 wherein each damping coil is a fractional-pitched coil.

15. The reluctance machine of claim 13 wherein the stator poles define a plurality of inter-pole slots, wherein at least one phase winding comprises a plurality of main phase winding coils and wherein each damping coil is positioned within the same slots as one of the main phase winding coils.

16. The reluctance machine of claim 15 wherein each damping coil produces magneto-motive forces that are in the opposite reference direction as the magneto-motive forces produced by the main phase winding coil with which the damping coil shares slots when positive current is flowing through the damping coil and the main phase winding coil.

17. The reluctance machine of claim 15 where each main phase winding coil is associated with a damping coil, wherein each main phase winding coil surrounds the same portion of the stator as its associated damping coil and wherein each damping coil is positioned with respect to its associated main phase winding coil such that both the damping coil and the main phase winding coil are in physical contact with the portion of the stator surrounded by the damping and main phase winding coils.

18. The reluctance machine of claim 15 wherein each damping coil produces magneto-motive forces that are in the same reference direction as the magneto-motive forces produced by the main phase winding coil with which the damping coil shares slots when positive current is flowing through the damping coil and the main phase winding coil.

19. The reluctance machine of claim 13 wherein a diode is inserted into the damping winding to block the flow of current in one direction.

20. The reluctance machine of claim 19 wherein the diode permits positive current.

21. The reluctance machine of claim 13 further comprising a plurality of damping windings.

22. The reluctance machine of claim 21 wherein each damping winding is a fully-pitched winding.

23. An improved reluctance machine comprising:
    a stator defining a plurality of stator poles and a plurality of slots between the stator poles;
    a rotor defining a plurality of rotor poles;
    at least one phase winding; and
    damping means for absorbing energy from and providing energy to the at lest one phase winding to reduce unwanted machine noise and vibration wherein the damping means includes conductive members positioned within each of the plurality of slots, wherein each conductive member is included in a circuit forming a closed current loop.

24. The reluctance machine of claim 23 further comprising an energy storing device coupled to the damping means.

25. The reluctance machine of claim 24 wherein the energy storage device is a capacitor coupled in series with the damping means.

26. The reluctance machine of claim 23 further comprising an energy absorbing device coupled to the damping means.

27. The reluctance machine of claim 26 wherein the energy absorbing device is a resistor coupled in series with the damping means.

28. The reluctance machine of claim 23 further comprising a capacitor and a resistor coupled to the damping means.

29. The reluctance machine of claim 28 wherein the capacitor and the resistor are connected in parallel.

30. The reluctance machine of claim 28 wherein the capacitor and the resistor are connected in series.

31. A reluctance machine comprising:
    a stator;
    a rotor positioned to rotate with respect to the stator, the rotor defining at least four rotor poles;
    at least one phase winding positioned within the stator; and
    at least four damping circuits positioned to rotate with the rotor, each damping circuit comprising a short circuited conductive coil wound about a rotor pole to form a closed-current loop.

32. A reluctance machine comprising:
    a stator;
    a rotor position to rotate with respect to the stator;
    at least one phase winding; and
    at least one fully-pitched damping winding positioned within the stator, the fully-pitched damping winding forming a closed current loop wherein current may flow in both positive and negative directions.

* * * * *